(12) United States Patent
Murayama et al.

(10) Patent No.: US 6,221,468 B1
(45) Date of Patent: Apr. 24, 2001

(54) MAGNETIC RECORDING MEDIUM

(75) Inventors: Yuichiro Murayama; Katsuhiko Meguro; Hiroshi Hashimoto, all of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/220,337

(22) Filed: Dec. 24, 1998

(30) Foreign Application Priority Data

Dec. 25, 1997 (JP) .................................................... 9-357617
Dec. 25, 1997 (JP) .................................................... 9-357618
Mar. 31, 1998 (JP) ................................................. 10-085938
Mar. 31, 1998 (JP) ................................................. 10-085939

(51) Int. Cl.[7] .................................................. G11B 05/702
(52) U.S. Cl. ........................ 428/215; 428/323; 428/328; 428/329; 428/425.9; 428/694 BU; 428/900
(58) Field of Search ................... 428/425.9, 694 BU, 428/900, 323, 328, 329, 215

(56) References Cited

U.S. PATENT DOCUMENTS

| 5,668,223 | * | 9/1997 | Tadokoro et al. | 525/440 |
| 5,700,541 | | 12/1997 | Okita et al. | 428/65.4 |
| 5,702,821 | * | 12/1997 | Murayama et al. | 428/425.9 |
| 5,952,437 | * | 9/1999 | Tadokoro et al. | 525/440 |
| 5,989,716 | * | 11/1999 | Hashimoto et al. | 428/425.9 |

FOREIGN PATENT DOCUMENTS

| 0 735 524 A2 | 10/1996 | (EP) . |
| 2 284 160 | 2/1976 | (FR) . |
| 8-147670 | 6/1996 | (JP) . |
| 8-293115 | 11/1996 | (JP) . |
| 9-305954 | 11/1997 | (JP) . |

OTHER PUBLICATIONS

European Search Report.

* cited by examiner

*Primary Examiner*—Stevan A. Resan
(74) *Attorney, Agent, or Firm*—Sughrue, Mion, Zinn, Macpeak & Seas, PLLC

(57) ABSTRACT

In a magnetic recording medium comprising a nonmagnetic substrate and at least one magnetic layer provided on the nonmagnetic substrate, in which layer a ferromagnetic fine powder and a binder are dispersed together, the magnetic layer comprises as a substantial binder a polyurethane obtained from a polyester polyol, a chain extender and an organic diisocyanate. The ferromagnetic fine powder contains cobalt-containing iron as a main component, and the polyurethane comprises a polyester polyol containing an aliphatic dibasic acid as a dibasic acid, and a diol component, at least 70 mol % of which contains an alkyl branched side chain having at least 2 carbon atoms.

22 Claims, No Drawings

MAGNETIC RECORDING MEDIUM

BACKGROUND OF THE INVENTION

The present invention relates generally to a magnetic recording medium comprising a nonmagnetic substrate and at least one magnetic layer in which a ferromagnetic powder and a binder are dispersed together and which is provided on the nonmagnetic substrate, said magnetic layer provided on an underlying layer in which at least one of a magnetic fine powder and a nonmagnetic powder and a binder are dispersed together, and more specifically to a magnetic recording medium of the above type, which is improved in terms of electromagnetic performance and durability.

Magnetic recording media are now widely used in the form of recording tapes, video tapes, and floppy disks. A magnetic recording medium comprises a magnetic recording layer which is stacked on a nonmagnetic substrate, and in which ferromagnetic powders are dispersed in a binder.

The magnetic recording medium should maintain various properties such as electromagnetic performance, durability against running, and running performance at high levels. In other words, a sound recording and reproduction audio tape is now required to be capable of higher-fidelity sound reproduction. A video tape, too, is now required to have excellent electromagnetic performance. For instance, the video tape is required to be capable of higher-fidelity picture or image reproduction.

Thus, the magnetic recording medium is required to have such excellent electromagnetic performance and, at the same time, satisfactory durability against running, as mentioned above. One major component of the magnetic layer, i.e., the binder is known to play an important role in improving durability, and electromagnetic performance. Problems with resins used so far in the art, for instance, vinyl chloride resin, cellulose resin, urethane resin, and acrylic resin are that they make the magnetic layer poor in wear resistance, and contaminate the mechanics for running the magnetic tape.

Contamination of a magnetic head is a chief cause for degradation in electromagnetic performance. In equipment for high-density recording in particular, the number of rotations of the magnetic head is now on the increase. For instance, a digital video tape recorder uses a magnetic head rotating at 9,600 rpm much higher than 1,800 rpm in the case of consumer analog video taper recorders, and 5,000 rpm in the case of commercially used analog tape recorders. At such high speeds of rotation, the sliding speed between the magnetic recording medium and the magnetic head increases, too. The magnetic head itself is superseded by a miniature magnetic head like a thin-film magnetic head. Thus, it is strongly required to prevent contamination of the magnetic head with components resulting from the magnetic recording medium.

To provide a solution to such problems, it has been proposed to increase the hardness of the magnetic layer by using a more durable, hard binder.

For instance, JP-A 6-259746 discloses a magnetic recording medium wherein a polyurethane composed of a polyester diol comprising a branched or alicyclic glycol, an aromatic dibasic acid and an alicyclic dibasic acid is used as a binder.

However, the polyester resin referred to in the synthesis example has a glass transition temperature, Tg, of 8 to 30° C. When this polyurethane is used to make a coating layer, the coating layer becomes soft on the whole, resulting in a durability drop. Since the aromatic dibasic acid and alicyclic dibasic acid are used as acid components of the n polyester, the polyurethane decreases in solvent solubility, with decreasing dispersibility. JP-A 6-96437 discloses a magnetic recording medium using a polyester polyurethane having an urethane group concentration of 2.5 mmol/g or more and a polyvinyl acetal resin, and JP-A 7-50010 discloses a polyurethane containing 0 to 5 mol % of polyol in urethane and having a high urethane concentration. However, these polyurethanes are less than satisfactory in terms of dispersibility. In addition, these publications disclose nothing about the advantages obtained by using such polyurethanes in combination with specific ferromagnetic powders.

When a polyurethane with no long branch therein has an increased urethane group concentration, its solvent solubility decreases due to too high polarity and the dispersibility of magnetic powders therein becomes insufficient. Accordingly, a coating solution obtained from this polyurethane increases in viscosity, and so provides a coating layer having some large surface roughness. Thus, no high electromagnetic performance is obtained.

JP-A 3-88119 discloses a magnetic recording medium comprising an aliphatic urethane-containing lower layer and an aromatic urethane-containing upper layer, JP-A 6-76265 discloses a polyurethane comprising a polyester diol using a branched polyvalent alcohol, and JP-A 6-314424 discloses a polyurethane comprising a polyester polyol using 3-methyl-1,5-pentanediol and an aliphatic dicarboxylic acid. However, all these polyurethanes, because of having a low Tg, provide a coating layer that is soft on the whole or on the surface. A problem with this coating layer, when used with a video tape, is that it is susceptible to fluidization due to the sliding between it and a rotating head, resulting in a drop of durability against running. Another problem is that after the video tape is stored in a high-temperature environment, the surface of the coating layer becomes soft and so increases in the coefficient of friction, resulting in a snarl-up of the video tape.

JP-A 8-127632 discloses an urethane which comprises a polyester polyol using a branched aliphatic glycol and a tertiary amino group-containing chain extender and has a Tg of 30° C. or higher. However, this urethane is found to be insufficient in terms of solvent solubility, and dispersibility as well, because a compound having an aromatic ring is used for the polyester polyol. When a video tape coated with this urethane is run through a video tape recorder after storage at high temperature and humidity, a running problem is likely to arise due to a strength decrease of the coating layer.

JP-A 9-69222 discloses the use of a polyurethane containing a short-chain diol having a cyclic structure together with 10 to 50% by weight of polyether polyol. This polyether type urethane is used for a lower layer. However, a multilayer tape with a polyester type urethane used for an upper layer is found to have insufficient electromagnetic performance because a coating layer has a rough surface.

JP-A 3-83221 discloses a magnetic recording medium using polyether urethane for a lower layer and polyester urethane for an upper layer. However, the polyester urethane used for the upper layer, because of containing much aromatic polyester polyol, is of decreased solvent solubility and so has insufficient dispersibility. Since the polyether urethane used for the lower layer has a Tg lower than room temperature and so provides a coating layer that is soft on the whole, this magnetic recording medium is found to have insufficient durability as well.

JP-A 7-176042 discloses that an aliphatic polyester urethane is used for the uppermost layer and an urethane having a bisphenol A polypropylene oxide in its main chain is used for magnetic layers other than the uppermost layer. However, the aliphatic polyester polyurethane used for an upper layer, because of having a low Tg and low coating strength, is insufficient in terms of durability, and the urethane used for a lower layer is of decreased solvent solubility and so insufficient in terms of dispersibility in powders in the lower layer. The publication makes no reference to chain extenders, and the example therein uses a neopentyl glycol having 2 carbon atoms in a branched chain. Dispersibility is still insufficient.

JP-A 9-44840 discloses a magnetic recording medium where an urethane resin comprising a polyester polyol using terephthalic acid, naphthalene dicarboxylate and 2-methyl-1,3-propanediol is used as a binder. Since an aromatic ring or naphthalene is used as the dicarboxylic acid component of polyester, however, this urethane resin is of decreased solvent solubility and so of insufficient dispersibility. When a magnetic tape coated with this urethane resin is stored at high temperature, the coefficient of friction is found to increase.

Magnetic recording media comprising yttrium-containing ferromagnetic powders are disclosed in JP-A's 7-210856 and 7-272253. JP-A 7-272253 refers to the use of polyurethane only in the context of general binders. With this polyurethane, it is difficult to disperse ferromagnetic powders because of large magnetic energy among ferromagnetic powder particles.

One object of the invention is to provide a magnetic recording medium comprising a coating layer in which ferromagnetic powders are dispersed with ever higher dispersibility to ensure excellent electromagnetic performance and high coating strength, and which is much more improved in terms of durability against running as well.

Another object of the invention is to provide a magnetic recording medium comprising a coating layer having an ever higher smoothness to ensure ever higher electromagnetic performance. Yet another object of the invention is to provide a magnetic recording medium excellent in dispersibility and dispersion stability, and excellent in electromagnetic performance as well. Still yet another object of the invention is to provide a magnetic recording medium excellent in running performance and storage stability at high temperature.

A further object of the invention is to provide a magnetic recording medium excellent in still durability.

SUMMARY OF THE INVENTION

The present invention provides a magnetic recording medium comprising a nonmagnetic substrate and at least one magnetic layer provided on said nonmagnetic substrate, in which magnetic layer a ferromagnetic fine powder and a binder are dispersed together, wherein:

said magnetic layer comprises as said binder a polyurethane obtained from a polyester polyol, a chain extender, and an organic diisocyanate, and said ferromagnetic fine powder is a ferromagnetic fine powder comprising cobalt-containing iron as a main component, said polyurethane being a polyurethane (PAO) comprising a polyester polyol containing an aliphatic dibasic acid as a dibasic acid therein, and a diol component, at least 70 mol % of which contains an alkyl branched side chain having at least 2 carbon atoms.

Preferably in the above magnetic recording medium, the ferromagnetic fine powder is a ferromagnetic fine powder comprising iron as the main component, wherein an yttrium-to-iron atomic ratio is Y/Fe=0.5 to 20 at %.

Preferably in the above magnetic recording medium, the ferromagnetic fine powder is a ferromagnetic fine powder comprising aluminum-containing iron as the main component.

Preferably in the above magnetic recording medium, the ferromagnetic powder has a length of 0.05 to 0.25 µm.

Preferably in the above magnetic recording medium, the ferromagnetic powder has a crystallite size of 12 to 25 nm.

Preferably in the above magnetic recording medium, the polyurethane is a polyurethane (PA1) in which a polyester polyol comprises an aliphatic dibasic acid as a dibasic acid, and a diol component, at least 70 mol % of which contains a cyclic structure-free alkyl branched side chain having at least 2 carbon atoms, or a polyurethane (PA2) which comprises a polyester polyol comprising an aliphatic dibasic acid as a dibasic acid, and a diol component, at least 70 mol % of which contains an alkyl branched aliphatic diol having a total of at least 2 carbon atoms in a branched side chain thereof per molecule and a chain extender comprising an alkyl branched aliphatic diol having a total of at least 3 carbon atoms in a branched side chain thereof per molecule.

Preferably in the above magnetic recording medium, the polyurethane is a polyurethane having at least one polar group selected from the following group.

$SO_3M$, $SO_4M$, $PO_3M_2$, $OPO_3M_2$, and $-NR_2$, where M represents a hydrogen atom, an alkaline metal, an alkaline earth metal, or ammonium, and R stands for an alkyl group having 1 to 12 carbon atoms.

The present invention also provides a magnetic recording medium comprising a nonmagnetic substrate, a lower layer provided on said nonmagnetic substrate, in which lower layer a magnetic powder or an inorganic powder and a binder are dispersed together, and at least one magnetic layer provided on said lower layer, in which magnetic layer a ferromagnetic fine powder and a binder are dispersed together, wherein:

at least one binder in said lower layer and said magnetic layer comprises as a substantial binder a polyurethane obtained from a polyester polyol, a chain extender and an organic diisocyanate, and said ferromagnetic powder is a ferromagnetic fine powder containing iron as a main component and having an yttrium-to-iron ratio, Y/Fe, of 0.5 to 20 at %, said polyurethane being a polyurethane (PAO) comprising a polyester polyol containing an aliphatic dibasic acid as a dibasic acid therein and a diol component, at least 70 mol % of which contains an alkyl branched side chain having at least 2 carbon atoms.

Preferably in the above magnetic recording medium, the polyurethane is a polyurethane (PA1) in which a polyester polyol comprises an aliphatic dibasic acid as a dibasic acid and a diol component, at least 70 mol % of which contains a cyclic structure-free alkyl branched side chain having at least 2 carbon atoms, or a polyurethane (PA2) which comprises a polyester polyol comprising an aliphatic dibasic acid as a dibasic acid and a diol component, at least 70 mol % of which contains an alkyl branched aliphatic diol having a total of at least 2 carbon atoms in a branched side chain thereof per molecule and a chain extender comprising an alkyl branched aliphatic diol having a total of at least 3 carbon atoms in a branched side chain thereof per molecule.

Preferably in the above magnetic recording medium, the polyurethane is a polyurethane having at least one polar group selected from the following group.

$SO_3M$, $SO_4M$, $PO_3M_2$, $OPO_3M_2$, and $-NR_2$, where M represents a hydrogen atom, an alkaline metal, an alkaline earth metal, or ammonium, and R stands for an alkyl group having 1 to 12 carbon atoms.

Preferably in the above magnetic recording medium, the magnetic layer has a thickness of at most 0.2 μm upon drying and the lower layer has a thickness of at least 1 μm upon drying.

Preferably, the magnetic layer contains an organic phosphorus compound selected from those represented by the following formulae (1) to (3):

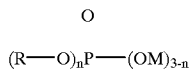

(1)

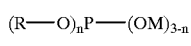

(2)

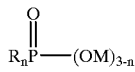

(3)

where R represents an unsubstituted or substituted alkyl, alkenyl or aryl group, and n=1 or 2.

Preferably in the above magnetic recording medium, at least one of the lower layer and the magnetic layer contains an organic phosphorus compound selected from those represented by the following formulae (1) to (3), and the magnetic layer has a thickness of at most 1.0 μm.

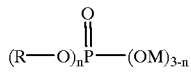

(1)

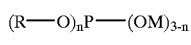

(2)

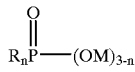

(3)

where R represents an unsubstituted or substituted alkyl, alkenyl or aryl group, and n=1 or 2.

Preferably in the above magnetic recording medium, the polyurethane (PA1) or (PA2) has an urethane group concentration of 3.0 meq/g to 4.0 meq/g.

Preferably in the above magnetic recording medium, the binder in the magnetic layer contains a polyurethane obtained by the reaction of raw materials including a polyester polyol, a chain extender and an organic diisocyanate, said polyurethane being a polyurethane (PA3) comprising a polyester polyol containing an aliphatic dibasic acid as a dibasic acid and an aliphatic diol component, at least 70 mol % of which comprises a cyclic structure-free alkyl branched side chain and a chain extender comprising an aliphatic diol comprising an alkyl branched side chain having a total of at least 3 carbon atoms in a branched side chain thereof, and the binder in the lower layer is a polyurethane (PB1) comprising 10 to 50 by weight of a polyol containing 1.0 to 6.0 mmol/g of an ether group, 15 to 50% by weight of a chain extender comprising a diol having a cyclic structure and an organic diisocyanate.

Preferably in the above magnetic recording medium, the polyurethane (PA3) has an urethane group concentration of 2.5 to 4.5 mmol/g.

Preferably in the above magnetic recording medium, the polyurethane (PB1) comprises a polyol containing 1.0 to 6.0 mmol/g of an ether group therein, as represented by

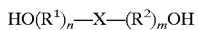

where:

n=4 to 40, and m=4 to 40,

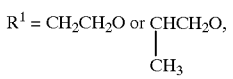

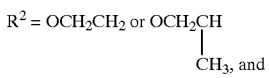

X is at least one group selected from the following group:

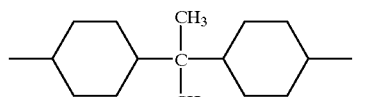

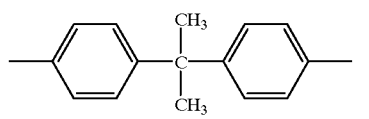

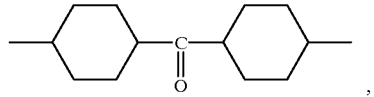

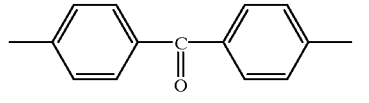

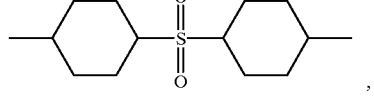

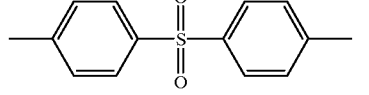

Preferably in the above magnetic recording medium, the polyurethane (PB1) comprises a diol chain extender having a cyclic structure, as represented by the following formula:

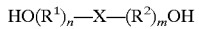

where:

n=4 to 40, and m=4 to 40,

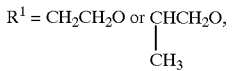

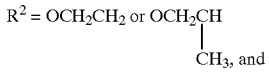

X is at least one group selected from the following group:

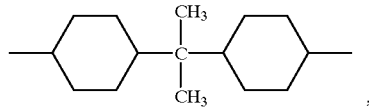

-continued

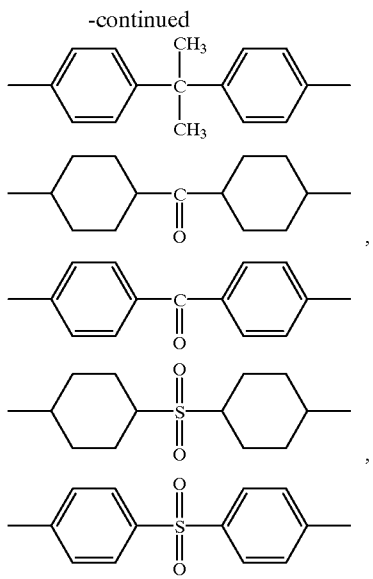

Preferably in the above magnetic recording medium, the binder in the magnetic layer is a polyurethane (PB1) comprising 10 to 50 by weight of a polyol containing 1.0 to 6.0 mmol/g of an ether group, 15 to 50% by weight of a chain extender comprising a diol having a cyclic structure and an organic dusocyanate, and the binder in the lower layer contains a polyurethane obtained by the reaction of raw materials including a polyester polyol, a chain extender and an organic diisocyanate, said polyurethane being a polyurethane (PA3) comprising a polyester polyol containing an aliphatic dibasic acid as a dibasic acid and an aliphatic diol component, at least 70 mol % of which comprises a cyclic structure-free alkyl branched side chain and a chain extender comprising an aliphatic diol comprising a n alkyl branched side chain having a total of at least 3 carbon atoms in a branched side chain thereof.

Preferably in the above magnetic recording medium, the polyurethane (PA3) has an urethane group concentration of 2.5 to 4.5 mmol/g.

Preferably in the above magnetic recording medium, the polyurethane (PB1) comprises a polyol containing 1.0 to 6.0 mmol/g of an ether group therein, as represented by $$HO(R^1)_n\text{—}X\text{—}(R^2)_m OH$$

where:

n=4 to 40, and m=4 to 40, $R^1 = CH_2CH_2O$ or $\underset{CH_3}{CHCH_2O}$, $R^2 = OCH_2CH_2$ or $\underset{CH_3}{OCH_2CH}$, and X is at least one group selected from the following group:

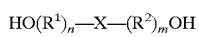

-continued

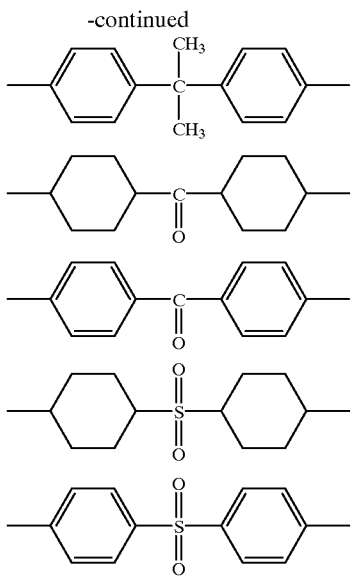

Preferably in the above magnetic recording medium, the polyurethane (PB1) comprises a diol chain extender having such a cyclic structure as given by $$HO(R^1)_n\text{—}X\text{—}(R^2)_m OH$$

where:

n=0 to 3, and m=0 to 3, $R^1 = CH_2CH_2O$ or $\underset{CH_3}{CHCH_2O}$, $R^2 = OCH_2CH_2$ or $\underset{CH_3}{OCH_2CH}$, and X is at least one group selected from the following group:

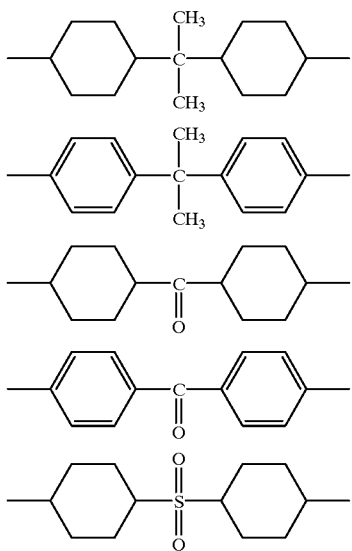

-continued

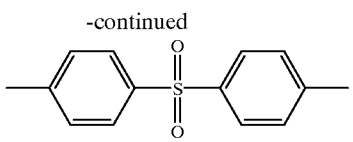

DESCRIPTION OF THE PREFERRED EMBODIMENT

According to the invention, it has now been found that a magnetic recording medium improved in terms of electromagnetic performance and durability against running can be obtained by dispersing ferromagnetic powders that contain cobalt-containing iron, and yttrium-containing iron as the main component and are less susceptible to dispersion because of strong magnetic energy among them by use of a binder comprising a polyurethane that is excellent in dispersibility and having a specific chemical structure.

A problem with an ordinary tape is that when the tape is stored in a high-temperature environment, a relatively low-molecular-weight, soft component contained in a polyurethane molecule is susceptible to precipitation on the surface of the layer coated thereon. According to the invention, it has been found that this problem can be solved by using ferromagnetic powders in combination with a polyurethane derived from a polyester polyol in which there is introduced an aliphatic diol containing an alkyl branched side chain having at least 2 carbon atoms. The polyurethane according to the invention has an urethane group concentration higher than usual, so that its glass transition temperature, Tg, can be increased, resulting in a durability improvement. However, the solubility of this polyurethane in solvents tends to become low due to the high urethane group concentration. Such low solvent solubility can be increased by use of the diol containing a branched side chain having two or more carbon atoms. Thus, the polyurethane according to the invention makes improvements in durability while dispersibility is kept at a high level.

Even when the tape is stored at high temperatures, it is thus possible to prevent an increase in the coefficient of friction and so prevent the tape from snarling up through a video tape recorder.

In the polyurethane (PA3) according to the invention, the polyester polyol comprises an aliphatic dibasic acid and an aliphatic diol having an alkyl branched side chain. In other words, the polyol is free from any cyclic structure acting unfavorably on solvent solubility, for instance, an aromatic or cyclohexane ring, or the diol has a branched side chain. This may account for one advantage of PA3 that association of urethane or ester bonds can be sterically hindered to reduce molecular interaction, resulting in an improvement in solvent solubility, especially an improvement in the dispersibility of a magnetic material susceptible to agglomeration due to magnetic energy. Another advantage of PA3 is that it is generally less susceptible to thermal decomposition than a polyether type polyurethane. Especially when PA3 is used for the uppermost magnetic layer in contact with a video tape recorder's head, it is thus possible to prevent a drop of coating strength due to the heat of sliding of the tape surface on the head.

The polyurethane (PB1) according to the invention contains an ether group in a proper amount, and makes the dispersibility of powders in the lower layer better. This is believed to be due to the ability of the ether group to adsorb powders thereon. Further, PB1 ensures an improved coating strength and a durability improvement as well, because of the presence therein of a short-chain diol having a cyclic structure. Especially when PB1 is used for the lower layer in a magnetic recording medium wherein the upper layer is made up of polyurethane PA3 using as the chain extender a long-chain diol having an alkyl branched side chain having a total of at least 3 carbon atoms, it is found that protuberances or asperities of 10 nm or longer can be reduced. It is thus possible to reduce spacing losses especially in the case of a digital system operating at a short recording wavelength, and so achieve an improvement in electromagnetic performance. A possible reason for this is that when the upper and lower layers are provided by co-coating, the diffusion of the binder from the lower layer to the upper layer hardly occurs, thereby making a phenomenon wherein the coating interface between them is out of order unlikely to occur and so achieving a smoother coating layer surface.

The polyurethane (PA3) according to the invention, because of being less compatible with a generally available ester type lubricant, makes it easy for the lubricant to emerge on the coating surface at a drying step, etc. By using PA3 in combination with a highly dispersible magnetic layer using PB1, it is thus possible to arrive at a reasonable tradeoff between high electromagnetic performance and high durability against running. Especially excellent still durability is achievable.

Then, the polyurethanes herein used are explained.

For the aliphatic diols having a branched side chain, which may be used for polyurethane PA0 and polyurethane PA1 according to the invention, and the branched aliphatic diols which may be used for polyurethane PA3 according to the invention, for instance, use may be made of 2,2-dimethyl-1,3-propanediol, 3,3-dimethyl-1,5-penthanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentandiol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Particularly preferable examples of the cyclic structure-free diol containing an alkyl branched side chain having 2 or more carbon atoms, which may be used for polyurethane PA1, are 2-ethyl-1,3-hexanediol, 2-butyl-1,3-propanediol, and 2,2-diethyl-1,3-propanediol.

Preferable examples of the alkyl branched side chain diol having a total of 2 or more carbon atoms in a branched side chain per molecule, which may be used for polyurethane PA2, are 2,2-dimethyl-1,3-propanediol, and 3,3-dimethyl-1,5-pentanediol.

Particularly preferable examples of the alkyl branched side chain diol having a total of 2 or more carbon atoms in a branched side chain per molecule, which may be used for polyurethane PA3, are 2,2-dimethyl-1,3-propanediol, 2-ethyl-2-butyl-1,3-propane diol, and 2,2-diethyl-1,3-propanediol.

The diol used for the polyester polyol contains a diol having a branched side chain in an amount of preferably 80 to 100 mol %, and more preferably 90 to 100 mol %.

For the branched aliphatic diol which may be used for polyurethane PA2 and has a total of 3 or more carbon atoms in a branched side chain per molecule, for instance, use may be made of 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1, 5-pentandiol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-.,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Particular preference is given to 2-ethyl-2-butyl-1,3-propanediol, and 2,2-diethyl-1,3-propanediol.

For the aliphatic dibasic acid which may be used for the polyester polyol, exemplary mention is made of succinic acid, adipic acid, azelaic acid, sebacic acid, malonic acid, glutaric acid, pimelic acid, and suberic acid.

Particular preference is given to succinic acid, adipic acid, and sebacic acid.

Preferably, the aliphatic dibasic acid accounts for at least 70 mol % of all dibasic acid components of the polyester polyol. At less than 70 mol %, the proportion of dibasic acid components having a cyclic structure, for instance, aromatic dibasic acids increases substantially, resulting in drops of solvent solubility, and dispersibility.

For the short-chain diol which has a cyclic structure and may be used for polyurethane PB1, exemplary mention is made of bisphenol A, hydrogenated bisphenol A, bisphenol S, hydrogenated bisphenol S, bisphenol P. and hydrogenated bisphenol P, to which ethylene oxide, and propylene oxide may be added, as shown below. Particular preference is given to hydrogenated bisphenol A, to which propylene oxide may or may not be added. It is then preferable that the content of the short-chain diol having a cyclic structure is 20 to 40% by weight. At less than 20% by weight, dynamic strength and durability decrease. At higher than 40% by weight, solvent solubility and dispersibility decrease.

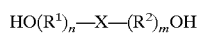

where:

n=0 to 3, and m=0 to 3,

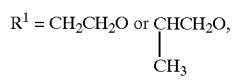

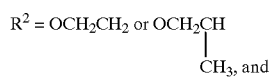

X is at least one group selected from the following group:

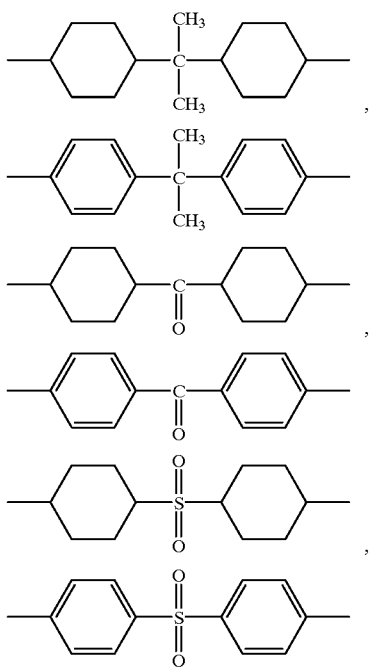

For the polyol which may be used for polyurethane PB1 and contains an ether group, exemplary mention is made of bisphenol A, hydrogenated bisphenol A, bisphenol S, hydrogenated bisphenol S, bisphenol P, and hydrogenated bisphenol P, to which ethylene oxide, and propylene oxide may be added, as shown below. Particular preference is given to hydrogenated bisphenol A, to which propylene oxide may or may not be added.

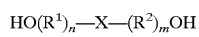

where:

n=4 to 40, and m=4 to 40,

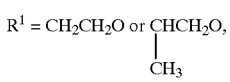

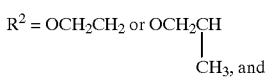

X is at least one group selected from the following group:

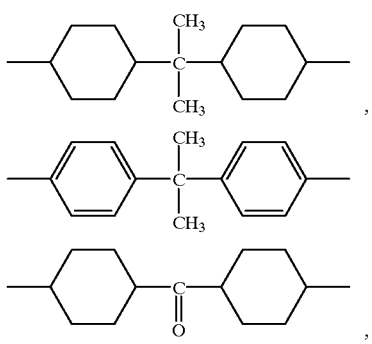

-continued

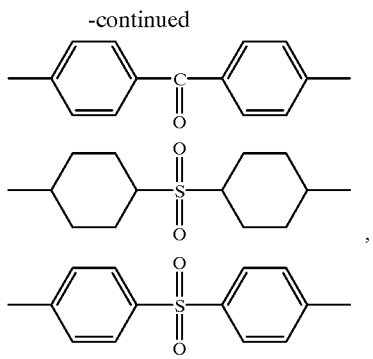
,

It is then preferable that the content of the polyol containing an ether group is 20% by weight to 45% by weight. At less than 20% by weight, dispersibility decreases with a decrease in the ability of the binder to adsorb powders thereon. At greater than 45% by weight, durability drops due to a coating strength decrease.

For the organic diisocyanate, exemplary mention is made of aromatic diisocyanates such as 2,4-tolylene diisocyanate, 2,6-tolylene diisocyanate, xylene-1,4-diisocyanate, xylene-1,3-diisocyanate, 4,4'-diphenylmethane diisocyanate, 4,4-diphenyl ether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, napthylene-1,4-diisocyanate, naphthylene-1,5-diisocyanate, and 3,3'-dimethoxydiphenyl-4,4'-diisocyanate, aliphatic diisocyanates such as tetramethylene diisocyanate, hexamethylene diisocyanate, and lysine diisocyanate, and alicyclic diisocyanates such as isophorone diisocyanate, hydrogenated tolylene diisocyanate, and hydrogenated phenylmethane diisocyanate.

Preference is given to the aromatic diisocyanates, and particular preference is given to 4,4-diphenylmethane diisocyanate, 2,2-tolylene diisocyanate, p-phenylene diisocyanate, and isophorone diisocyanate.

Preferably, the polyurethane according to the invention has a molecular weight of 30,000 to 70,000, and especially 40,000 to 60,000, as represented by weight-average molecular weight, Mw.

At less than 30,000, durability decreases with decreasing coating strength. At greater than 70,000, dispersibility decreases with decreasing solvent solubility.

The polyurethane according to the invention has a glass transition temperature, Tg, of preferably 50° C. to 150° C., more preferably 70° C. to 120° C., and even more preferably 80° C. to 100° C.

At lower than 50° C., durability and storability decrease with decreasing coating strength at high temperatures. At higher than 150° C., moldability on calendering decreases, resulting in a lowering of electromagnetic performance.

For the polar group in the polyurethane of the invention, $-SO_3M$, $-OSO_3M$, $-PO_3M_2$, and $-COOM$ are preferred with $-SO_3M$, and $-OSO_3M$ being most preferred. The polyurethane of the invention has a polar group content of preferably $1 \times 10^{-5}$ eq/g to $2 \times 10^{-4}$ eq/g. At lower than $1 \times 10^{-5}$ eq/g, the adsorption of the polyurethane to a magnetic material becomes insufficient, resulting in a dispersibility drop. At higher than $2 \times 10^{-4}$ eq/g, the solubility of the polyurethane in solvents becomes low, again resulting in a dispersibility drop.

The polyurethane according to the invention has an urethane group concentration of preferably 3.0 meq/g to 4.0 meq/g, and more preferably 3.3 mmol/g to 3.7 mmol/g for polyurethane PA1, and polyurethane PA2, respectively. At less than 3.0 mmol/g, the polyurethane provides a coating layer decreasing in glass transition temperature, Tg, and so in durability. At greater than 4.0 mmol/g, dispersibility decreases with decreasing solvent solubility. In addition, some synthesis problems arise because it is inevitably impossible to incorporate the polyol in the polyurethane. For instance, it is difficult to regulate the molecular weight of the polyurethane.

Polyurethane PA3 has a polar group content of preferably 2.5 mmol/g to 4.5 mmol/g, and more preferably 3.0 mmol/g to 4.0 mmol/g. At less than 2.5 mmol/g, the polyurethane provides a coating layer decreasing in glass transition temperature, Tg, and so in durability. At greater than 4.5 mmol/g, dispersibility decreases with decreasing solvent solubility. In addition, some synthesis problems arise because it is inevitably impossible to incorporate the polyol in the polyurethane. For instance, it is difficult to regulate the molecular weight of the polyurethane.

The polyurethane according to the invention should preferably contain 2 to 20 OH groups, and especially 3 to 15 OH groups per molecule. At less than 3 OH groups per molecule, the reactivity of the polyurethane with the isocyanate curing agent drops, resulting in decreases in the strength and durability of coating layer. At greater than 15 OH groups per molecule, on the other hand, dispersibility decreases with decreasing solvent solubility.

It is acceptable to incorporate the following organic phosphorus compounds in the binder in the magnetic recording medium of the invention.

 (1)

 (2)

 (3)

where R represents an unsubstituted or substituted alkyl, alkenyl or aryl group, and n=1 or 2.

Exemplary organic phosphorus compounds are $(Ph-O)PO(OH)_2$, $(Ph-O)_2PO(OH)$, $(Ph-O)P(OH)_2$, $(Ph-O)_2PO(OH)$, $Ph-PO(OH)_2$, $(Ph-O)_2PO(OH)$, $C_6H_{13}OPO(OH)_2$, $(C_6H_{13}O)_2PO(OH)$, $C_6H_{13}OP(OH)_2$, $(C_6H_{13}O)_2P(OH)$, $C_6H_{13}PO(OH)_2$, $(C_6H_{13})_2PO(OH)$, $C_8H17OPO(OH)_2$, $C_{10}H_{21}OPO(OH)_2$, $C_{12}H_{25}OPO(OH)_2$, $C_{14}H_{29}OPO(OH)_2$, $C_{16}H_{33}OPO(OH)_2$, $C_{18}H_{37}OPO(OH)_2$, $C_8H_{17}PO(OH)_2$, $C_{10}H_{21}PO(OH)_2$, $C_{12}H_{25}PO(OH)_2$, $C_{14}H_{29}PO(OH)_2$, $C_{16}H_{33}PO(OH)_2$, and $C_{18}H_{37}PO(OH)_2$. It is here to be noted that Ph represents a phenyl group.

Of these compounds, preference is given to $(Ph-O)PO(OH)_2$, $(Ph-O)P(OH)_2$, $Ph-PO(OH)_2$, $(Ph-O)_2PO(OH)$, $C_{10}H_{21}OPO(OH)_2$, $C_{12}H_{25}OPO(OH)_2$, $C_{14}H_{29}OPO(OH)_2$, $C_{16}H_{33}OPO(OH)_2$, $C_{18}H_{37}OPO(OH)_2$, $C_{10}H_{21}PO(OH)_2$, $C_{12}H_{25}PO(OH)_2$, $C_{14}H_{29}PO(OH)_2$, $C_{16}H_{33}PO(OH)_2$, and $C_{18}H_{37}PO(OH)_2$.

When the binder of the invention is used for the magnetic layer, it is acceptable to use a vinyl chloride type synthetic resin in combination with the polyurethane according to the invention. The vinyl chloride resin, which may be used in the invention, has a degree of polymerization of preferably 200 to 600, and more preferably 250 to 450. The vinyl chloride resin used herein may also be a copolymer of vinyl monomers, for instance, vinyl acetate, vinyl alcohol, vinylidene chloride, and acrylonitrile.

For the formation of each magnetic layer, various synthetic resins may be used in addition to the polyurethane of the invention, and the vinyl chloride resin. For instance, ethylene-vinyl acetate copolymers, cellulose derivatives such as nitrocellulose, acrylic resins, polyvinyl acetal resins, polyvinyl butyral resins, epoxy resins, and phenoxy resins may be used alone or in combination of two or more.

When these additional synthetic resins may be used, it is desired that the polyurethane contained in the magnetic layer account for preferably 10 to 90% by weight, more preferably 20 to 80% by weight, and even more preferably 25 to 60% by weight of the binder. It is also desired that the vinyl chloride resin account for preferably 10 to 80% by weight, more preferably 20 to 70% by weight, and even more preferably 30 to 60% by weight of the binder.

A curing agent such as a polyisocyanate compound may be used together with the binder according to the invention. Examples of the polyisocyanate compound are a reaction product of 3 moles of tolylene diisocyanate and 1 mole of trimethylolpropane (e.g., Desmodule L-75 made by Bayer AG), a reaction product of 3 moles of a diisocyanate such as xylylene diisocyanate or hexamethylene diisocyanate and 1 mole of trimethylolpropane, a burette adduct to 3 moles of hexamethylene diisocyanate, an isocyanurate compound with 5 moles of tolylene diisocyanate, an isocyanurate adduct compound of 3 moles of tolylene diisocyanate and 2 moles of hexamethylene diisocyanate, and a polymer of isophorone diisocyanate and diphenylmethane diisocyanate.

It is then desired that the polyisocyanate compound contained in the magnetic layer account for preferably 10 to 50% by weight, and more preferably 20 to 40% by weight of the binder.

When electron beam curing is carried out, it is acceptable to make use of a compound having a reactive double bond, for instance, urethane acrylate.

The total weight of the resin component plus curing agent (i.e., the binder) is usually in the range of preferably 15 to 40 parts by weight, and more preferably 20 to 30 parts by weight per 100 parts by weight of ferromagnetic powders.

For the ferromagnetic powders for use with the magnetic recording medium of the invention, it is desired to employ cobalt-containing ferromagnetic iron oxide powders or cobalt-containing ferromagnetic alloy powders having an SBET specific surface area of 40 to 80 $m^2/g$, and preferably 50 to 70 $m^2/g$. Crystallite size is 12 to 25 nm, preferably 13 to 22 nm, and more preferably 14 to 20 nm. Length is 0.05 to 0.25 $\mu$m, preferably 0.07 to 0.2 $\mu$m, and more preferably 0.08 to 0.15 $\mu$m. The ferromagnetic powders used herein may be those based on cobalt-containing iron, and Co—Ni—Fe systems, which may additionally contain yttrium. Referring to the content of yttrium in the ferromagnetic powders, the yttrium-to-iron atomic ratio is preferably Y/Fe=0.5 at % to 20 at %, and more preferably Y/Fe=5 at % to 10 at %. At lower than 0.5 at %, the ferromagnetic powders cannot have any high $\sigma S$ value, and so fail to have high magnetic properties and, hence, high electromagnetic performance. At greater than 20 at %, the content of iron decreases, resulting in drops of magnetic properties and, hence, electromagnetic performance. Additionally, the ferromagnetic powders may contain elements such as aluminum, silicon, sulfur, scandium, titanium, vanadium, chromium, manganese, copper, zinc, molybdenum, rhodium, palladium, gold, tin, antimony, boron, barium, tantalum, tungsten, rhenium, lead, phosphorus, lanthanum, cerium, praseodymium, neodymium, tellurium, and bismuth in the range of up to 20 at % per 100 at % of iron. The ferromagnetic powders may also contain small amounts of water, hydroxides, and oxides.

Set out below is one example of how to prepare the ferromagnetic powder which contains as a main component iron with cobalt, and yttrium introduced therein according to the invention.

In this example, iron oxyhydroxide obtained by blowing an oxidizing gas into an aqueous suspension comprising a mixture of ferrous salt and alkali is used as the starting material.

Preferred iron oxyhydroxide is $\alpha$-FeOOH. According to the first process of making this iron oxyhydroxide, the ferrous salt is first neutralized with alkali hydroxide to prepare an aqueous suspension of $Fe(OH)_2$. Then, the oxidizing gas is blown into the suspension to obtain an acicular form of $\alpha$-FeOOH. According to the second process, on the other hand, the ferrous salt is first neutralized with alkali carbonate to prepare an aqueous suspension of $FeCO_3$. Then, the oxidizing gas is blown into the suspension to obtain a spindle form of $\alpha$-FeOOH. Preferred iron oxyhydroxide is obtainable by allowing an aqueous ferrous salt solution to react with an aqueous alkali solution to obtain an aqueous solution containing ferrous hydroxide, and oxidizing the ferrous hydroxide-containing aqueous solution with air, etc. In this case, salts of alkaline earth elements such as Ni, Ca, Ba, and Sr salts, Cr salt, Zn salt or the like may exist with the aqueous ferrous salt solution. By making a suitable selection from such salts it is possible to regulate particle shape and size (length-to-breadth ratio).

For the ferrous salt it is preferable to use ferrous chloride, ferrous sulfate, etc., and for the alkali it is preferable to use sodium hydroxide, ammonia water, ammonium carbonate, sodium carbonate, etc. Preferable salts that may exist with the aqueous ferrous salt solution are chlorides such as nickel chloride, calcium chloride, barium chloride, strontium chloride, chromium chloride, and zinc chloride.

Then, an aqueous solution of a cobalt compound such as cobalt sulfate, and cobalt chloride is stirred and mixed with a slurry of the above iron oxyhydroxide to introduce cobalt thereinto. For the introduction of yttrium, a slurry of cobalt-containing iron oxyhydroxide is first prepared. Then, an aqueous solution containing an yttrium compound is stirred and mixed with the slurry.

Elements other than yttrium, for instance, neodymium, samarium, praseodymium, and lanthanum may also be introduced in the ferromagnetic powder of the invention. These may be introduced in the ferromagnetic powder of the invention in the form of chlorides such as yttrium chloride, neodymium chloride, samarium chloride, praseodymium chloride, and lanthanum chloride, and nitrates such as neodymium nitrate, and gadolinium nitrate, which may be used alone or in combination of two or more.

Usually but not exclusively, the ferromagnetic powder of the invention may be used in an acicular, granular, dice, grain-of-rice, and sheet form. It is particularly preferable to use an acicular form of ferromagnetic powders.

The above resin component, curing agent and ferromagnetic powders are milled and dispersed with a solvent ordinarily used for the preparation of magnetic coating materials, for instance, methyl ethyl ketone, dioxane, cyclohexanone, and ethyl acetate to form a magnetic coating material. Milling and dispersion should preferably be carried out as usual.

It is here to be noted that the magnetic coating material may contain, in addition to the above components, ordinarily used additives and fillers, for instance, abrasives such as α-$Al_2O_3$, and $Cr_2O_3$, antistatics such as carbon black, and lubricants and dispersants such as fatty acids, fatty esters, and silicone oil.

Then, the lower nonmagnetic layer, and lower magnetic layer in the multilayer structure of the invention are explained. The inorganic powders used for the lower layer in the invention may be either magnetic powders or nonmagnetic powders. The nonmagnetic powders, for instance, may be selected from inorganic compounds such as metal oxides, metal carbonates, metal sulfates, metal nitrides, metal carbides, and metal sulfides. For the inorganic compounds, for instance, use may be made of α-alumina having an α-phase content of 90 to 100%, γ-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These may be used alone or in combination of two or more. Particular preference is given to titanium dioxide, zinc oxide, iron oxide, and barium sulfate, with the titanium dioxide being most preferred. Preferably, these nonmagnetic powders have an average particle size of 0.005 to 2 μm. However, the advantages of the invention may be obtained even when nonmagnetic powders with varying average particle size are used in combination of two or more, or a single type of nonmagnetic powders having a wide particle size distribution Zare used. More preferably, the nonmagnetic powders should have an average particle size of 0.01 μm to 0.2 μm and a pH value between 6 and 9. The nonmagnetic powders should have a specific surface area of preferably 1 to 100 $m^2/g$, more preferably 5 to 50 $m^2/g$, and even more preferably 7 to 40 $m^2/g$. Also, the nonmagnetic powders should have a crystallite size of preferably 0.01 μm to 2 μm, a DBP oil absorption of 5 to 100 ml/100 g, preferably 10 to 80 ml/100 g, and more preferably 20 to 60 ml/100 g, and a specific gravity of 1 to 12, and preferably 3 to 6. The nonmagnetic powders used may be in an acicular, spherical, polyhedral or sheet form.

Preferably, the nonmagnetic powders should be surface-treated to allow $Al_2O_3$, $SiO_2$, $TiO_2$, $ZrO_2$, $SnO_2$, $Sb_2O_3$, and ZnO to be present on the surface thereof. Particular preference is given to $Al_2O_3$, $SiO_2$, $TiO_2$, and $ZrO_2$ because of their excellent dispersibility, among which $Al_2O_3$, $SiO_2$, and $ZrO_2$ are most preferred. These compounds may be used alone or in combination of two or more. Alternatively, use may be made of a surface-treated layer subjected to co-precipitation depending on purpose. Still alternatively, the surface of the nonmagnetic powder may be treated with alumina, and the alumina layer may then be treated with silica, and vice versa. The surface-treated layer may be a porous layer depending on purpose, although it is preferably a homogeneous and intimate layer.

If carbon black is mixed with the lower layer, it is then possible to achieve an Rs decrease as carried out in the prior art, and obtain a micro-Vickers hardness as desired. To this end, use may be made of furnace black for rubber, thermal black for rubber, coloring carbon black, acetylene black, etc.

The carbon black herein used should have a specific surface area of 100 to 500 $m^2/g$, and preferably 150 to 400 $m^2/g$, a DBP oil absorption of 20 to 400 ml/100 g, and preferably 30 to 200 ml/100 g, an average particle size of 5 pm to 80 μm, preferably 10 to 50 μm, and more preferably 10 to 40 μm, a pH value of 2 to 10, a water content of 0.1 to 10%, and a tap density of 0.1 to 1 g/ml. Exemplary products of the carbon black used herein are BLACK PEARLS 2000, 1300, 1000, 900, 800, 880, and 700, and VULCAN XC-72, all made by Cabot Co., Ltd., #3050B, 3150B, 3250B, #3750B, #3950B, #950, #650B, #970B, #850B, and MA-600, all made by Mitsubishi Chemical Industries, Ltd., CONDUCTEX SC, and RAVEN 8800, 8000, 7000, 5750, 5250, 3500, 2100, 2000, 1800, 1500, 1255, and 1250, all made by Colombian Carbon Co., Ltd., and Ketchen Black EC made by Aczo Co., Ltd.

Magnetic powders may also be used for the lower layer according to the invention. The magnetic powders used herein, for instance, are γ-$Fe_2O_3$, Co-doped γ-$Fe_2O_3$, alloys composed mainly of α-Fe, and $CrO_2$, among which the Co-doped γ-$Fe_2O_3$ is most preferred. The ferromagnetic powders used for the lower layer according to the invention should preferably the same composition and performance as in the upper magnetic layer according to the invention. However, the performance of the upper and lower layers may be varied depending on purpose, as usually carried out in the prior art. To improve longer wavelength recording performance, for instance, it is desired to make the Hc of the lower magnetic layer lower than that of the upper magnetic layer, and make the Br of the lower magnetic layer higher than that of the upper magnetic layer. In addition, it is possible to take advantage of a known multilayer structure.

The binder, lubricant, dispersant, additive and solvent, and dispersion techniques used for the lower magnetic, and nonmagnetic layers may be the same as in known magnetic layers. In particular, the techniques available for the known magnetic layers may be applied to the amount and type of binder, and the amount and type of solvent and dispersant.

The magnetic coating material prepared from the above materials is coated on the nonmagnetic substrate to form a magnetic layer.

Known substrates such as biaxially stretched polyethylene naphthalate, polyethylene terephthalate, polyamide, polyimide, polyamide-imide, aromatic polyamide, and polybenzoxidazole substrates may be used for the nonmagnetic substrate used herein. Among these, the polyethylene, and aromatic polyamide substrates are preferred. These nonmagnetic substrates may have been subjected to pre-treatments such as corona discharge treatment, plasma treatment, easy-to-bond treatment, and thermal treatment. The nonmagnetic substrate used herein should preferably have a very smooth surface as represented by a center-line average surface roughness between 0.1 nm and 20 nm, and especially 1 nm and 10 nm at a cut-off value of 0.25 mm. Further, the nonmagnetic substrate should not only have a small center-line average surface roughness but also be free from any coarse asperity of greater than 1 μ.

For instance, the magnetic recording medium of the invention may be fabricated by coating a coating solution for the magnetic layer on the surface of the moving nonmagnetic substrate in such a way that the magnetic layer has a thickness between 0.05 μm and 3.0 μm, and preferably 0.07 μm and 1.0 μm as measured after drying. In this case, a plurality of coating materials may concurrently or successively be coated on the nonmagnetic substrate.

For a coating system for coating the magnetic coating material, various coating machines may be used, inclusive of air doctor coating, blade coating, rod coating, extrusion coating, air knife coating, squeeze coating, dip coating, reverse roll coating, transfer roll coating, gravure coating, kiss coating, cast coating, spray coating, and spin coating machines.

For these machines, for instance, refer to "The State-of-the-Art in Coating Techniques", published by Sogo Gijutsu Center Co., Ltd. on May 31, 1983.

When the present invention is applied to a magnetic recording medium comprising two or more layers, it is preferable to use the following coating machines and methods.

(1) First, the lower layer is coated on a nonmagnetic substrate using a coating machine generally used for the coating of magnetic coating materials, for instance, a gravure, roll, blade or extrusion coating machine. Then, the upper layer is coated on the lower layer while the lower layer remains still undried, using a substrate pressing type extrusion coating machine as disclosed in JP-B 1-46186, and JP-A's 60-238179 and 2-265672.

(2) The lower, and upper layers are almost concurrently coated on a nonmagnetic substrate, using a single coating head having two coating solution supply slits, as disclosed in JP-A's 63-88080, 2-17971 and 2-265672.

(3) The lower, and upper layers are almost concurrently coated on a nonmagnetic substrate, using an extrusion coating machine provided with a backup roll, as disclosed in JP-A 2-174965.

A backing layer may be provided on the surface of the nonmagnetic substrate used herein, which has no magnetic coating material coated thereon. Usually, the backing layer is obtained by coating the magnetic coating material-free surface of the nonmagnetic substrate with a backing layer-forming coating material in which granular components such as abrasives and antistatics and a binder are dispersed together in an organic solvent.

It is here to be noted that both surfaces of the nonmagnetic substrate may have been coated with adhesive layers.

The coating layer obtained by applying the magnetic coating material on the nonmagnetic substrate is dried after the ferromagnetic powders contained in the coating layer have been oriented in a magnetic field.

The thus dried coating layer is subjected to a surface-smoothing treatment. For the surface-smoothing treatment, for instance, a super-calender roll may be used. By carrying out the surface-smoothing treatment, it is possible to obtain a magnetic recording medium having high electromagnetic performance, because the filling rate of the ferromagnetic powders with respect to the magnetic layer is increased by the vanishing of voids caused by removal of the solvent upon drying.

Heat-resistant plastic rolls such as epoxy, polyimide, polyamide, and polyamide-imide rolls may be used as the calendering roll. A metal roll, too, may be used to this end.

The magnetic recording medium of the invention should preferably have an extremely smooth surface as represented by a center-line average surface roughness of 0.1 nm and 4 nm, and especially 1 nm and 3 nm at a cut-off value of 0.25 mm. To this end, for instance, it is preferable to subject the magnetic layer made up of a specific ferromagnetic powder and a selected binder to the aforesaid calender treatment. Referring here to the calender treatment conditions, the calender roll is controlled in the temperature range of 60 to 100° C., preferably 70 to 100° C., and more preferably 80 to 100° C., and the calendering pressure is controlled in the range of 100 to 500 kg/cm$^2$, preferably 200 to 450 kg/cm$^2$, and more preferably 300 to 400 kg/cm$^2$.

The thus cured multilayer structure is cut into any desired shape.

The polyurethane of the invention contains as the polyol components an aliphatic dibasic acid and a branched aliphatic diol in an amount larger than used so far in the art, as already mentioned, and so has high solvent solubility, with improvements in the dispersibility of the ferromagnetic powders therein. In addition, the polyurethane of the invention has a high urethane group concentration, so that its Tg can be higher than that of conventional aliphatic urethane.

The increase in the concentration of the urethane group that is a hydrogen bonding component, on the one hand, gives rise to an increase in the coating strength such as Tg due to the molecular interaction in the dried coating film. This increase, on the other hand, gives rise to a drop of the solubility of the polyurethane in a solvent, which makes the dispersibility of ferromagnetic powders therein low due to an increase in the viscosity of the coating solution. However, the polyurethane of the invention is characterized in that its solvent solubility does not drop because of its high urethane group concentration, and because the aliphatic dibasic acid and branched aliphatic diol are used as the polyester polyol component. This appears to be due to the fact that association of polyurethane molecules in the coating solution is prevented due to the presence of the branched chain.

EXAMPLE

The present invention will now be explained in more detail with reference to the following examples.

Unless otherwise stated, "part" means a part by weight and "%" means % by weight.

Synthesis Example 1 of Polyurethane

Polyester polyols shown in Table 1, and chain extenders, diols and DEIS (dimethyl sulfoisophthalate) shown in Table 2, were dissolved in cyclohexanone at 60° C. in a nitrogen stream in a vessel, said vessel being provided with a reflux condenser and a stirrer and replaced therein by nitrogen. In Table 1, the amount shown is given by mol %, and the molecular weight given is found from hydroxyl group value.

Then, 60 ppm of a catalyst, di-n-dibutyltin dilaurate, was added to, and dissolved in, the solution for 5 minutes. In addition, 4,4'-diphenylmethane diisocyanate (MDI) in the amount shown in Table 2 was added to the solution for a 6-hour reaction with the application of heat thereto at 90° C., thereby obtaining a polyurethane solution. The weight-average molecular weight and glass transition temperature of each polyurethane PAl are shown in Table 2.

TABLE 1

| Component | Type of Polyester Polyol | | | | | | | | | | | | | | |
|---|---|---|---|---|---|---|---|---|---|---|---|---|---|---|---|
| | a | b | c | d | e | f | g | h | i | j | k | l | m | n | o |
| Dibasic acid | | | | | | | | | | | | | | | |
| Adipic acid | 100 | 100 | 100 | 100 | 100 | 100 | 100 | 100 | 100 | 83 | | | 70 | 70 | 90 |
| Terephthalic acid | | | | | | | | | | | 49 | | | | |
| 2,6-naphthalene dicarboxylate | | | | | | | | | | | | 28 | | | |
| Isophthalic acid | | | | | | | | | | | 49 | 70 | | | |

TABLE 1-continued

| Component | Type of Polyester Polyol | | | | | | | | | | | | | | |
|---|---|---|---|---|---|---|---|---|---|---|---|---|---|---|---|
| | a | b | c | d | e | f | g | h | i | j | k | l | m | n | o |
| Sodium 5-sulfo-isophthalate | | | | | | | | | | 17 | 2 | 2 | 30 | 30 | 10 |
| Branched glycol | | | | | | | | | | | | | | | |
| 2-ethyl-1,3-hexanediol | 70 | | | 100 | | 60 | | | | | | | | | |
| 2-ethyl-2-butyl-1,3-propanediol | | 70 | | | 100 | | 60 | | | | 60 | 80 | | | |
| 2,2-diethyl-1,3-propandiol | | | 70 | | | 100 | | 60 | | | | | | | |
| 2,2-dimethyl-1,3-propanediol | | | | | | | | | | | | | 100 | | 100 |
| 3,3-dimethyl-1,5-pentanediol | | | | | | | | | | | | | | 100 | |
| 3-methyl-1,5-pentanediol | | | | | | | | | 100 | | | | | | |
| Optional component | | | | | | | | | | | | | | | |
| 1,6-hexanediol | 30 | 30 | 30 | | | | 40 | 40 | 40 | | | | | | |
| Ethylene glycol | | | | | | | | | | | 40 | 20 | | | |
| Molecular weight | 620 | 620 | 650 | 625 | 584 | 621 | 610 | 580 | 605 | 1000 | 1800 | 2300 | 625 | 630 | 650 |

TABLE 2

| Poly-urethane (PA1) | Polyester polyol | | Chain extender | | DEIS (Mole) | Diisocyanate MDI (Mole) | Urethane group concentration mmol/g | Mw | Tg (° C.) |
|---|---|---|---|---|---|---|---|---|---|
| | Type and Amount | (Mole) | Type and Amount | (Mole) | | | | | |
| 1A | a | 24 | 2-ethyl-1,3-hexanediol | 26 | 2 | 48 | 3.1 | 41000 | 64 |
| 1B | b | 23 | 2-ethyl-2-butyl-1,3-propanediol | 27 | 2 | 48 | 3.1 | 42000 | 72 |
| 1C | c | 25 | 2,2-diethyl-1,3-propanediol | 25 | 2 | 48 | 3.0 | 39000 | 76 |
| 1D | d | 25 | 2-ethyl-1,3-hexanediol | 25 | 2 | 48 | 3.0 | 36000 | 79 |
| 1E | e | 25 | 2-ethyl-2-butyl-1,3-propanediol | 25 | 2 | 48 | 3.1 | 37000 | 82 |
| 1F | f | 25 | 2,2-diethyl-1,3-propanediol | 25 | 2 | 48 | 3.0 | 38000 | 83 |
| 1G COMP | a | 10 | 2-ethyl-1,3-hexanediol | 40 | 2 | 48 | 3.9 | 37000 | 86 |
| 1H | g | 24 | 2-ethyl-1,3-hexanediol | 26 | 2 | 48 | 3.1 | 41000 | 46 |
| 1I | h | 24 | 2-ethyl-2-butyl-1,3-propanediol | 26 | 2 | 48 | 3.2 | 38000 | 39 |
| 1J | i | 25 | 2,2-dietyl-1,3-propanediol | 25 | 2 | 48 | 3.1 | 38000 | 32 |
| 1K | j | 10 | 2-ethyl-2-butyl-1,3-propanediol | 40 | 0 | 48 | 3.4 | 76000 | 63 |
| 1L | k | 23 | Neopentyl glycol hydroxypivalate | 29 | 0 | 48 | 1.6 | 36000 | 65 |
| 1M | l | 19 | Neopentyl glycol hydroxypivalate | 30 | 0 | 50 | 1.6 | 41000 | 68 |
| 1N | a | 5 | 2-ethyl-1,3-hexanediol | 45 | 2 | 48 | 4.3 | 38000 | 83 |
| 1O INV | a | 35 | 2-ethyl-1,3-hexanediol | 15 | 2 | 48 | 2.6 | 41500 | 45 |
| 1P | m | 22 | 2-ethyl-2-butyl-1,3-propanediol | 25 | 0 | 53 | 3.4 | 38000 | 92 |

TABLE 2-continued

| Poly- urethane (PA1) | Polyester polyol | | Chain extender | | | Diisocyanate | Urethane group | | |
|---|---|---|---|---|---|---|---|---|---|
| | Type and Amount | (Mole) | Type and Amount | (Mole) | DEIS (Mole) | MDI (Mole) | concentration mmol/g | Mw | Tg (° C.) |
| 1Q | n | 23 | 2-ethyl-2-butyl-1,3-propanediol | 26 | 0 | 51 | 3.2 | 36500 | 95 |
| 1R | o | 20 | 2-ethyl-2-butyl-1,3-propanediol | 25 | 0 | 55 | 3.6 | 37800 | 83 |
| 1S | o | 20 | 2,2-dieithyl-1,3-propanediol | 27 | 0 | 53 | 3.6 | 41000 | 85 |
| 1T | o | 20 | 2,2-dimeithyl-1,3-propanediol | 25 | 0 | 55 | 3.7 | 38600 | 86 |

Example 1-1

One hundred (100) parts of ferromagnetic alloy powders (composition: Co/Fe=5 at % and Y/Fe=6 at %, Hc: 2,000 Oe, crystallite size: 15 nm, BET specific surface area: 59 m$^2$/g, length: 0.12 μm, aspect ratio: 7, and σs: 150 emu/g) were pulverized in an open kneader for 10 minutes. Then, the powders were milled with 20 parts (solid content) of polyurethane 1A and 60 parts of cyclohexanone. Then, the mixture was dispersed for 120 minutes in a sand mill with the addition thereto of the following components:

| | |
|---|---|
| Abrasive (Al$_2$O$_3$ with a particle size of 0.3 μm) | 2 parts |
| Carbon black (with a particle size of 40 nm) | 2 parts |
| Methyl ethyl ketone/toluene = 1/1 | 200 parts |

The dispersion was stirred and mixed together for a further 20 minutes with the addition thereto of the following components:

| | |
|---|---|
| Polyisocyanate (Colonate 3041 made by Nippon Polyurethane Co., Ltd.) | 5 parts (solid content) |
| Butyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material.

Then, a sulfonic acid-containing polyester resin was coated by means of a coil bar on the surface of a 10 μm thick polyethylene naphthalate substrate to prepare thereon an adhesive layer of 0.1 μm in thickness, as measured after drying.

Then, the obtained nonmagnetic coating material and the magnetic coating material for the upper layer were almost concurrently coated on the substrate in the described order using a reverse roll, the former with a post-drying thickness of 2.0 μm and the latter with a post-drying thickness of 0.1 μm. The nonmagnetic substrate with the magnetic coating material coated thereon was oriented in a magnetic field created by a 3,000 G magnet, while the magnetic coating material remained still undried, and then dried. The tape product was calendered through a combination of metal roll—metal roll—metal roll—metal roll—metal roll—metal roll—metal roll (at a speed of 100 m/min., a linear pressure of 300 kg/cm and a temperature of 90° C.), and then cut to a width of 6.35 mm to prepare a magnetic tape.

Examples 1-2 to 1-7, and Comparative Examples 1-1 to 1-8

In Examples 1-2 to 1-7, and Comparative Examples 1-7 to 1-8, magnetic tapes were prepared following Example 1-1 with the exception that polyurethane dA was changed to the polyurethanes shown in Table 3.

Example 1-8

A magnetic tape was prepared following Example 1-1 with the exception that the composition of ferromagnetic powders was changed to Y/Fe=0.5 at % and Co/Fe=5 at %.

Example 1-9

A magnetic tape was prepared following Example 1-1 with the exception that the composition of ferromagnetic powders was changed to Y/Fe=20 at % and Co/Fe=5 at %.

Examples 1-10 to 1-14

The magnetic coating solution in Example 1-1 was used as the magnetic coating solution for the upper layer.

Preparation of Nonmagnetic Solution for the Lower Layer

Eighty-five (85) parts of α-Fe$_2$O$_3$ (surface-treated to have Al$_2$O$_3$ and SiO$_2$ thereon, and having an average particle size of 0.15 μm, a BET specific surface area of 52 m$^2$/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO$_3$Na=6×10$^{-5}$ eq/g, epoxy=10$^{-3}$ eq/g, and Mw=30,000), 10 parts (solid content) of the sulfonic acid-containing polyurethane shown in Table 3, and 60 parts of cyclohexanone for 60 minutes. The mixture was then dispersed for 120 minutes in a sand mill with the addition thereto of the following component:

| | |
|---|---|
| Methyl ethyl ketone/cyclohexanone = 6/4 | 200 parts |

The dispersion was stirred and mixed for a further 20 minutes with the following components:

| | |
|---|---|
| Butyl stearate | 2 parts |
| Stearic acid | 1 part |
| Methyl ethyl ketone | 50 parts |

Thereafter, the mixture was filtered through a filter having an average pore diameter of 1 μm to prepare a nonmagnetic coating material for the lower layer.

Then, a sulfonic acid-containing polyester resin was coated by means of a coil bar on the surface of a 10 μm-thick polyethylene naphthalate substrate to prepare thereon an adhesive layer of 0.1 μm in thickness, as measured after drying.

Then, the obtained nonmagnetic coating material and the magnetic coating material were almost concurrently coated on the substrate in the described order using a reverse roll, the former with a post-drying thickness of 2.0 μm and the latter with a post-drying thickness of 0.1 μm. The nonmagnetic substrate with the magnetic coating material coated thereon was oriented in a magnetic field created by a 3,000 G magnet, while the magnetic coating material remained still undried, and then dried. The tape product was calendered through a combination of metal roll—metal roll—metal roll—metal roll—metal roll—metal roll—metal roll (at a speed of 100 m/min., a linear pressure of 300 kg/cm and a temperature of 90° C.), and then cut to a width of 6.35 mm to prepare a video tape.

Comparative Example 1-9

A video tape was prepared following Example 1-1 with the exception that the composition of ferromagnetic powders was changed to Co/Fe=5 at %.

Comparative Example 1-10

A video tape was prepared following Example 1-1 with the exception that the composition of ferromagnetic powders was changed to Y/Fe=25 at %, and Co/Fe=5 at %.

Comparative Example 1-11

A video tape was prepared following Example 1-1 with the exception that polyurethane 1A was changed to polyurethane 1H.

Comparative Example 1-12

A video tape was prepared following Example 1-1 with the exception that polyurethane 1A was changed to polyurethane 1T.

Then, the properties of the video tapes according to the examples and the comparative examples were measured by the following measuring method A. The results are reported in Table 3.

Measuring Method A a) Electromagnetic Performance:

A sample tape was inserted in a digital video tape recorder (NV-BJ1, Matsushita Electric Industrial Co., Ltd.) to record and reproduce signals at a recording wavelength of 0.5 μm. outputs of the tape were relatively estimated on the basis of the reference tape (Comparative Example 1-1) assumed to have an output of 0 dB upon reproduction.

b) SQ:

The SQ was measured at Hm=5 kOe, using a vibration sample type flux meter (made by Toei Kogyo Co., Ltd.).

c) Repetitive Running Performance:

A 60-minute tape was inserted in the VTR used at (a) for continuously repeated 100 run cycles in an environment of 40° C. and 80% RH to observe how much the video head was contaminated. Video outputs were continuously recorded to measure an output drop with respect to the first output assumed to be 0 dB.

Contamination of Video Head

Excellent (no contamination observed at all), and

Unsatisfactory (contamination observed visually).

d) Dropout Increase:

With a sample tape inserted in the video tape recorder used for the measurement of electromagnetic performance at (a), a 5-minute run cycle was repeated 1,000 passes in an environment of 23° C. and 10% RH. After this, the number of dropouts with an at least −10 dB output decrease over a time of at least 15 μsec. was measured.

e) Change in the coefficient of friction due to high-temperature storage:

While a 6.35 mm wide tape was in contact with a stainless (SUS 420J) rod of 4 mm in diameter under a tension of 20 g (T1) and at a wrapping angle of 180 degrees, the tape was run 100 passes at a speed of 14 mm/sec. and over an length of 100 mm. Then, tension (T2) was measured. The coefficient of friction was given by Coefficient of friction=$1/\pi \cdot \ln(T2/T1)$ A 60-minute tape in a reeled state was placed in a closed vessel with silica gel contained therein, which was then stored in a 60° C. oven for 1 week. Then, the coefficient of friction of the tape was compared with that of the tape assumed to be 100 before storage.

TABLE 3

| | Content of Y in ferromagnetic powders (at %) | Polyurethane (PA1) | Rate of increase in the coefficient of friction due to 60° C. storage (%) | SQ | Electromagnetic performance (dB) | Contamination of head | Output drop (dB) | Number of dropouts |
|---|---|---|---|---|---|---|---|---|
| Example 1-1 | 6 | 1A | 15 | 0.88 | 0.5 | Excellent | −0.1 | 8 |
| Example 1-2 | 6 | 1B | 15 | 0.89 | 0.5 | Excellent | −0.2 | 7 |
| Example 1-3 | 6 | 1C | 10 | 0.88 | 0.6 | Excellent | −0.1 | 8 |
| Example 1-4 | 6 | 1D | 20 | 0.88 | 0.6 | Excellent | −0.1 | 8 |
| Example 1-5 | 6 | 1E | 15 | 0.88 | 0.8 | Excellent | −0.1 | 7 |
| Example 1-6 | 6 | 1F | 10 | 0.88 | 0.7 | Excellent | −0.1 | 10 |
| Example 1-7 | 6 | 1G | 15 | 0.88 | 0.7 | Excellent | −0.3 | 10 |
| Example 1-8 | 0.5 | 1A | 30 | 0.87 | 0.7 | Excellent | −0.2 | 10 |

TABLE 3-continued

|  | Content of Y in ferromagnetic powders (at %) | Polyurethane (PA1) | Rate of increase in the coefficient of friction due to 60° C. storage (%) | SQ | Electromagnetic performance (dB) | Contamination of head | Output drop (dB) | Number of dropouts |
|---|---|---|---|---|---|---|---|---|
| Example 1-9 | 20 | 1A | 10 | 0.90 | 0.8 | Excellent | −0.3 | 5 |
| Example 1-10 | 6 | 1A | 23 | 0.90 | 0.7 | Excellent | −0.3 | 7 |
| Example 1-11 | 6 | 1P | 15 | 0.88 | 0.7 | Excellent | −0.1 | 6 |
| Example 1-12 | 6 | 1Q | 18 | 0.88 | 0.8 | Excellent | −0.2 | 8 |
| Example 1-13 | 6 | 1R | 20 | 0.88 | 0.7 | Excellent | −0.1 | 5 |
| Example 1-14 | 6 | 1S | 15 | 0.88 | 0.8 | Excellent | −0.1 | 7 |
| Comparative Example 1-1 | 6 | 1H | 120 | 0.82 | 0.0 | Unsatisfactory | −0.7 | 20 |
| Comparative Example 1-2 | 6 | 1I | 83 | 0.83 | 0.0 | Unsatisfactory | −0.7 | 23 |
| Comparative Example 1-3 | 6 | 1J | 110 | 0.80 | −0.2 | Unsatisfactory | −0.8 | 20 |
| Comparative Example 1-4 | 6 | 1K | 85 | 0.84 | 0.3 | Unsatisfactory | −1.1 | 35 |
| Comparative Example 1-5 | 6 | 1L | 86 | 0.78 | −0.7 | Unsatisfactory | −0.5 | 17 |
| Comparative Example 1-6 | 6 | 1M | 90 | 0.83 | −0.2 | Unsatisfactory | −1.1 | 24 |
| Comparative Example 1-7 | 6 | 1N | 78 | 0.83 | −0.3 | Unsatisfactory | −0.6 | 22 |
| Comparative Example 1-8 | 6 | 1O | 80 | 0.83 | −0.4 | Unsatisfactory | −0.7 | 23 |
| Comparative Example 1-9 | 0 | 1A | 76 | 0.81 | −0.1 | Unsatisfactory | −0.7 | 20 |
| Comparative Example 1-10 | 25 | 1A | 50 | 0.84 | 0.4 | Unsatisfactory | −0.7 | 23 |
| Comparative Example 1-11 | 6 | 1H | 100 | 0.79 | 0.0 | Unsatisfactory | 0.9 | 20 |
| Comparative Example 1-12 | 6 | 1T | 85 | 0.83 | 0.2 | Unsatisfactory | −0.7 | 17 |

Synthesis Example 2 of Polyurethane

Polyester polyols shown in Table 1, and chain extenders shown in Table 4 were dissolved in cyclohexanone at 60° C. in a nitrogen stream in a vessel provided with a reflux condenser and a stirrer and replaced therein by nitrogen. Then, 60 ppm of a catalyst, di-n-dibutyltin dilaurate, was added to, and dissolved in, the solution for 15 minutes. In addition, 4,4'-diphenylmethane diisocyanate (MDI) in the amount shown in Table 2 was added to the solution for a 6-hour reaction with the application of heat thereto at 90° C., thereby obtaining a polyurethane solution. The weight-average molecular weight and glass transition temperature of each polyurethane are reported in Table 4.

TABLE 4

| Polyurethane (PA2) | Polyester polyol | | Chain extender | | DEIS (Mole) | Diisocyanate MDI (Mole) | Urethane group concentration mmol/g | Mw | (° C.) |
|---|---|---|---|---|---|---|---|---|---|
| | Type and Amount | (Mole) | Type and Amount | (Mole) | | | | | |
| 1A | a | 24 | 2-ethyl-1,3-hexanediol | 26 | 2 | 48 | 3.1 | 41000 | 64 |
| 2B | b | 23 | 2-ethyl-2-butyl-1,3-propanediol | 27 | 2 | 48 | 3.1 | 42000 | 72 |
| 2C | c | 25 | 2,2-diethyl-1,3-propanediol | 25 | 2 | 48 | 3.0 | 39000 | 76 |
| 2D | d | 25 | 2-ethyl-1,3-hexanediol | 25 | 2 | 48 | 3.0 | 36000 | 79 |
| 2E | e | 25 | 2-ethyl-2-butyl-1,3-propanediol | 25 | 2 | 48 | 3.1 | 37000 | 82 |
| 2F | f | 25 | 2,2-diethyl-1,3-propanediol | 25 | 2 | 48 | 3.0 | 38000 | 83 |
| 2G | a | 10 | 2-ethyl-1,3-hexanediol | 40 | 2 | 48 | 3.9 | 37000 | 86 |
| 2H | g | 24 | 2-ethyl-1,3-hexanediol | 26 | 2 | 48 | 3.1 | 41000 | 46 |
| 2I | h | 24 | 2-ethyl-2-butyl-1,3-propanediol | 26 | 2 | 48 | 3.2 | 38000 | 39 |
| 2J | i | 25 | 2,2-dietyl-1,3-propandiol | 25 | 2 | 48 | 3.1 | 38000 | 32 |

TABLE 4-continued

| Poly- urethane (PA2) | Polyester polyol Type and Amount | (Mole) | Chain extender Type and Amount | (Mole) | DEIS (Mole) | Diisocyanate MDI (Mole) | Urethane group concentration mmol/g | Mw | (° C.) |
|---|---|---|---|---|---|---|---|---|---|
| 2K | j | 10 | 2-ethyl-2-butyl-1,3-propanediol | 40 | 0 | 48 | 3.4 | 76000 | 63 |
| 2L | k | 23 | Neopentyl glycol hydroxypivalate | 29 | 0 | 48 | 1.6 | 36000 | 65 |
| 2M | l | 19 | Neopentyl glycol hydroxypivalate | 30 | 0 | 50 | 1.6 | 41000 | 68 |
| 2N | a | 5 | 2-ethyl-1,3-hexanediol | 45 | 2 | 48 | 4.3 | 38000 | 83 |
| 2O | a | 35 | 2-ethyl-1,3-hexanediol | 15 | 2 | 48 | 2.6 | 41500 | 45 |
| 2P | m | 22 | 2-ethyl-2-butyl-1.3-propanediol | 25 | 0 | 53 | 3.4 | 38000 | 92 |
| 2Q | n | 23 | 2-ethyl-2-butyl-1,3-propanediol | 26 | 0 | 51 | 3.2 | 36500 | 95 |
| 2R | o | 20 | 2-ethyl-2-butyl-1,3-propanediol | 25 | 0 | 55 | 3.6 | 37800 | 83 |
| 2S | o | 20 | 2,2-diethyl-1,3-propanediol | 27 | 0 | 53 | 3.6 | 41000 | 85 |
| 2T | o | 20 | 2,2-dimeithyl-1,3-propanediol | 25 | 0 | 55 | 3.7 | 38600 | 86 |

Examples 2-1 to 2-15, and Comparative Examples 2-1 to 2-9
Preparation of Magnetic Solution for the Upper Layer One hundred (100) parts of ferromagnetic alloy powders (composition: 89 at % Fe, 5 at % Co, and 6 at % Al, Hc: 20,000 Oe, crystallite size: 15 nm, BET specific surface area: 59 m$^2$/g, length: 0.12 μm, aspect ratio: 7, and σs: 150 emu/g) were pulverized in an open kneader for 10 minutes. Then, the powders were milled with 20 parts (solid content) of polyurethane in Table 4 and 60 parts of cyclohexanone. Then, the mixture was dispersed for 120 minutes in a sand mill with the addition thereto of the following components:

| | |
|---|---|
| Abrasive (Al$_2$O$_3$ with a particle size of 0.3 μm) | 2 parts |
| Carbon black (with a particle size of 40 nm) | 2 parts |
| Methyl ethyl ketone/toluene = 1/1 | 200 parts |

The dispersion was stirred and mixed together for a further 20 minutes with the addition thereto of the following components:

| | |
|---|---|
| Polyisocyanate (Colonate 3041 made by Nippon Polyurethane Co., Ltd.) | 5 parts (solid content) |
| Butyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material.
Preparation of Nonmagnetic Solution for the Lower Layer Eighty-five (85) parts of α-Fe$_2$O$_3$ (surface-treated to have Al$_2$O$_3$ and SiO$_2$ thereon, and having an average particle size of 0.15 μm, a BET specific surface area of 52 m$^2$/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO$_3$Na=6×10$^{-5}$ eq/g, epoxy=10$^{-3}$ eq/g, and Mw=30,000), 10 parts (solid content) of the sulfonic acid-containing polyurethane shown in Table 4, and 60 parts of cyclohexanone for 60 minutes. The mixture was then dispersed for 120 minutes in a sand mill with the addition thereto of the following component:

| | |
|---|---|
| Methyl ethyl ketone/cyclohexanone = 6/4 | 200 parts |

The dispersion was stirred and mixed for a further 20 minutes with the following components:

| | |
|---|---|
| Butyl stearate | 2 parts |
| Stearic acid | 1 part |
| Methyl ethyl ketone | 50 parts |

Thereafter, the mixture was filtered through a filter having an average pore diameter of 1 μm to prepare a nonmagnetic coating material for the lower layer.

Then, a sulfonic acid-containing polyester resin was coated by means of a coil bar on the surface of a 10 μm thick polyethylene naphthalate substrate to prepare thereon an adhesive layer of 0.1 μm in thickness, as measured after drying.

Then, the obtained nonmagnetic coating material and the magnetic coating material were almost concurrently coated on the substrate in the described order using a reverse roll, the former with a post-drying thickness of 2.0 μm and the latter with a post-drying thickness of 0.1 μm. The nonmagnetic substrate with the magnetic coating material coated thereon was oriented in a magnetic field created by a 3,000 G magnet, while the magnetic coating material remained still undried, and then dried. The tape product was calendered through a combination of metal roll—metal roll—metal roll—metal roll—metal roll—metal roll—metal roll (at a speed of 100 m/min., a linear pressure of 300 kg/cm and a temperature of 90° C.), and then cut to a width of 6.35 mm to prepare a video tape.

Then, the properties of video tapes according to Examples 2-1 to 2-15, and Comparative Examples 2-1 to 2-9 were measured by the following measuring method B. The results are reported in Table 5.

Measuring Method B a) Surface Roughness Ra:

By using a light interference technique with a digital optical profilometer (made by WYKO), center-line surface roughness Ra was measured at a cut-off value of 0.25 mm.

e) Coefficient of friction after storage:

A 60-minute tape in a reeled state was stored in a dry environment of 60° C. for 1 week. Then, the coefficient of friction was measured.

TABLE 5

|  | Poly-urethane (PA2) | Organic phosphorus compound | | Surface roughness of magnetic layer Ra(nm) | SQ | Electromagnetic performance(dB) | Coefficient of friction | Coefficient of friction after 60° C. storage |
|---|---|---|---|---|---|---|---|---|
|  |  | Type | Amount part by weight |  |  |  |  |  |
| Example 2-1 | 2A | Ph—OPO(OH)$_2$ | 1 | 2.5 | 0.88 | 1.1 | 3.2 | 3.4 |
| Example 2-2 | 2B | Ph—OPO(OH)$_2$ | 1 | 2.4 | 0.89 | 1.2 | 3.3 | 3.5 |
| Example 2-3 | 2C | Ph—OPO(OH)$_2$ | 1 | 2.4 | 0.88 | 1.0 | 3.3 | 3.3 |
| Example 2-4 | 2D | Ph—OPO(OH)$_2$ | 1 | 2.4 | 0.88 | 0.9 | 3.2 | 3.3 |
| Example 2-5 | 2E | Ph—OPO(OH)$_2$ | 1 | 2.5 | 0.88 | 1.0 | 3.2 | 3.2 |
| Example 2-6 | 2F | Ph—OPO(OH)$_2$ | 1 | 2.4 | 0.88 | 1.1 | 3.3 | 3.4 |
| Example 2-7 | 2G | Ph—OPO(OH)$_2$ | 1 | 2.6 | 0.88 | 1.0 | 3.2 | 3.4 |
| Example 2-8 | 2N | Ph—OPO(OH)$_2$ | 1 | 2.4 | 0.88 | 1.2 | 3.2 | 3.3 |
| Example 2-9 | 2O | Ph—PO(OH)$_2$ | 1 | 2.3 | 0.89 | 1.3 | 3.3 | 3.3 |
| Example 2-10 | 2P | Ph—PO(OH)$_2$ | 1 | 2.3 | 0.88 | 1.4 | 3.1 | 3.3 |
| Example 2-11 | 2Q | Ph—PO(OH)$_2$ | 1 | 2.3 | 0.88 | 1.3 | 3.2 | 3.3 |
| Example 2-12 | 2R | Ph—PO(OH)$_2$ | 1 | 2.2 | 0.88 | 1.4 | 3.2 | 3.2 |
| Example 2-13 | 2S | Ph—PO(OH)$_2$ | 1 | 2.3 | 0.88 | 1.4 | 3.2 | 3.3 |
| Example 2-14 | 2A | Ph—OPO(OH)$_2$ | 2 | 2.1 | 0.89 | 1.5 | 3.3 | 3.4 |
| Example 2-15 | 2A | Ph—OPO(OH)$_2$ | 3 | 2.1 | 0.90 | 1.6 | 3.5 | 3.4 |
| Comparative Example 2-1 | 2A | Not used | — | 3 | 0.85 | 0.5 | 3.9 | 4.7 |
| Comparative Example 2-2 | 2H | Not used | — | 3.4 | 0.82 | 0.0 | 3.8 | 4.8 |
| Comparative Example 2-3 | 2H | Ph—OPO(OH)$_2$ | 1 | 2.9 | 0.84 | 0.4 | 3.7 | 4.3 |
| Comparative Example 2-4 | 2I | Not used | — | 3.4 | 0.82 | 0.0 | 3.7 | 4.7 |
| Comparative Example 2-5 | 2J | Not used | — | 3.4 | 0.80 | -0.2 | 3.8 | 4.5 |
| Comparative Example 2-6 | 2K | Not used | — | 3.6 | 0.81 | 0.1 | 3.7 | 4.6 |
| Comparative Example 2-7 | 2L | Not used | — | 3.4 | 0.81 | 0.1 | 3.7 | 4.6 |
| Comparative Example 2-8 | 2M | Not used | — | 3.5 | 0.82 | -0.2 | 3.8 | 4.7 |
| Comparative Example 2-9 | 2T | Not used | — | 3.4 | 0.81 | -0.3 | 3.6 | 4.7 | b) Electromagnetic Performance:

A sample tape was inserted in a digital video tape recorder (NV-BJ1, Matsushita Electric Industrial Co., Ltd.) to record and reproduce signals at a recording wavelength of 0.5 μm. Outputs of the tape were relatively estimated on the basis of the reference tape (Comparative Example 2-2) assumed to have an output of 0 dB upon reproduction.

c) SQ:

The SQ was measured at Hm=5 kOe, using a vibration sample type flux meter (made by Toei Kogyo Co., Ltd.).

d) Change in the coefficient of friction due to high-temperature storage:

While a 6.35 mm wide tape was in contact with a stainless (SUS 420J) rod of 4 mm in diameter under a tension of 20 g (T1) and at a wrapping angle of 180 degrees, the tape was run 100 passes at a speed of 14 mm/sec. and over an length of 100 mm. Then, tension (T2) was measured. The coefficient of friction was given by Coefficient of friction=1/π·ln (T2/T1)

In Table 5, Ph represents a phenyl group

Synthesis Example 3 of Polyurethane

Polyester polyols A and I having the compositions shown in Table 6, and 2-ethyl-2-butyl-1,3-propanediol at the composition ratios shown in Table 7 were dissolved in a 30% solution of cyclohexanone at 60° C. and in a nitrogen stream in a vessel provided with a reflux condenser and a stirrer and replaced therein by nitrogen. Then, 60 ppm of a catalyst, di-n-dibutyltin dilaurate, was added to, and dissolved in, the solution for 15 minutes. In addition, 4,4'-diphenylmethane diisocyanate (MDI) in the amount shown in Table 7 or 8 was added to the solution for a 6-hour reaction with the application of heat thereto at 90° C., thereby obtaining a polyurethane solution. Table 7 shows the weight-average molecular weight of each polyurethane PA3, and Table 8 shows the weight-average molecular weight of polyurethane PB1.

TABLE 6

| Component | Type of Polyester Polyol | | | | | | | | |
|---|---|---|---|---|---|---|---|---|---|
| | A | B | C | D | E | F | G | H | I |
| Dicarboxylic acid | | | | | | | | | |
| Adipic acid | 100 | 100 | 100 | 100 | 100 | | 100 | 100 | 90 |
| Isophthalic acid | | | | | | 100 | | | |
| Sulfoisophthalic acid | | | | | | | | | 10 |
| Diol component | | | | | | | | | |
| 2,2-dimeithyl-1,3-propanediol | 70 | 100 | | | 60 | 70 | | | 70 |
| 2-ethyl-2-butyl-1,3-propanediol | | | 70 | | | | 60 | | |
| 1,2-propanediol | | | | 70 | | | | | |
| 2,2-dieithyl-1,3-propanediol | | | | | | | 60 | | |
| 1,3-propanediol | 30 | | 30 | 30 | 40 | 30 | | | |
| 1,6-hexanediol | | | | | | | 40 | 40 | 30 |
| Molecular weight | 2100 | 2045 | 2750 | 2100 | 2180 | 2200 | 580 | 605 | 2150 |

TABLE 7

| Polyurethane (PA3) | Polyester polyol | | Chain extender | | | Diisocyanate | Urethane group concentration | |
|---|---|---|---|---|---|---|---|---|
| | Type and amount | (Mole) | Type and Amount | (Mole) | DEIS (Mole) | MDI (Mole) | mmol/g | Mw |
| 3A | A | 6 | 2-ethyl-2-butyl-1,3-propanediol | 100 | | 107 | 3.5 | 51000 |
| | I | 3 | | | | | | |
| 3B | B | 6 | 2-ethyl-2-butyl-1,3-propanediol | 100 | | 107 | 3.5 | 49500 |
| | I | 3 | | | | | | |
| 3C | C | 6 | 2-ethyl-2-butyl-1,3-propanediol | 100 | | 107 | 3.3 | 55000 |
| | I | 3 | | | | | | |
| 3D | D | 6 | 2-ethyl-2-butyl-1,3-propanediol | 100 | | 107 | 3.5 | 51000 |
| | I | 3 | | | | | | |
| 3E | A | 6 | 2-methyl-2-ethyl-1,3-propanediol | 100 | | 107 | 3.7 | 51500 |
| | I | 3 | | | | | | |
| 3F | E | 6 | 2-methyl-2-ethyl-1,3-propanediol | 100 | | 107 | 3.7 | 53000 |
| | I | 3 | | | | | | |
| 3G | F | 6 | 2-methyl-2-ethyl-1,3-propanediol | 100 | | 107 | 3.7 | 53000 |
| | I | 3 | | | | | | |
| 3H | A | 6 | 2,2-dimethl-1,3-propanediol | 100 | | 107 | 3.8 | 51000 |
| | I | 3 | | | | | | |
| 3I | G | 24 | 2-ethyl-2-butyl-1,3-propanediol | 26 | 2 | 48 | 3.1 | 40000 |
| 3J | H | 25 | 2,2-diethyl-1,3-propanediol | 25 | 2 | 48 | 3.1 | 39000 |

TABLE 8

| Poly-urethane (PBI) | Short-chain diol having a cyclic structure Type and Amount Wt % (mole) | | | Polyol having an ether group Type and amount Wt % (mole) | | | Diisocyanate MDI Wt % (mole) | | Concentration of ether group in urethane mmol/g | Mw |
|---|---|---|---|---|---|---|---|---|---|---|
| 4A | HBpA | 15 | 0.063 | Compound A | 50 | 0.083 | 33 | 0.132 | 5.4 | 51300 |
|    | DEIS | 2  | 0.006 |            |    |       |    |       |     |       |
| 4B | HBpA | 20 | 0.083 | Compound B | 45 | 0.045 | 33 | 0.132 | 5.6 | 50500 |
|    | DEIS | 2  | 0.006 |            |    |       |    |       |     |       |
| 4C | HBpA | 50 | 0.208 | Compound A | 10 | 0.010 | 38 | 0.152 | 1.3 | 52000 |
|    | DEIS | 2  | 0.006 |            |    |       |    |       |     |       |
| 4D | HBpA | 53 | 0.221 | Compound A | 10 | 0.010 | 40 | 0.160 | 1.2 | 51500 |
|    | DEIS | 2  | 0.006 |            |    |       |    |       |     |       |
| 4E | HBpA | 13 | 0.054 | Compound A | 50 | 0.083 | 34 | 0.136 | 5.5 | 52300 |
|    | DEIS | 2  | 0.006 |            |    |       |    |       |     |       |
| 4F | HBpA | 15 | 0.063 | Compound A | 55 | 0.092 | 28 | 0.112 | 6.0 | 51300 |
|    | DEIS | 2  | 0.006 |            |    |       |    |       |     |       |
| 4G | HBpA | 20 | 0.083 | Compound B | 50 | 0.050 | 28 | 0.112 | 6.3 | 51000 |
|    | DEIS | 2  | 0.006 |            |    |       |    |       |     |       |
| 4H | HBpA | 55 | 0.229 | Compound B | 6  | 0.006 | 37 | 0.148 | 0.8 | 53100 |
|    | DEIS | 2  | 0.006 |            |    |       |    |       |     |       |

In table 8,

HBpA: hydrogenated bisphenol A

Compound A: bisphenot A propylene oxide adduct (motecular weight: 600)

Compound B: bisphenot A propylene oxide adduct (molecular weight: 1,000) and

MDI: diphenytmethane diisocyanate

Example 3-1

Preparation of Magnetic Coating Material for the Upper Layer

One hundred (100) parts of ferromagnetic alloy powders (composition: 89 at % Fe, 5 at % Co, and 6 at % Y, Hc: 2,000 Oe, crystallite size: 15 nm, BET specific surface area: 59 m²/g, length: 0.12 µm, aspect ratio: 7, and cs: 150 emu/g) were pulverized in an open kneader for 10 minutes. Then, the powders were milled for 60 minutes with the following components:

| Polyurethane 3A | 20 parts (solid content) |
|---|---|
| Cyclohexanone | 60 parts |

Then, the mixture was dispersed for 120 minutes in a sand mill with the addition thereto of the following components:

| Abrasive (Al₂O₃ with a particle size of 0.3 µm) | 2 parts |
|---|---|
| Carbon black (with a particle size of 40 nm) | 2 parts |
| Methyl ethyl ketone/toluene = 1/1 | 200 parts |

The dispersion was stirred and mixed together for a further 20 minutes with the addition thereto of the following components:

| Polyisocyanate (Colonate 3041 made by Nippon Polyurethane Co., Ltd.) | 5 parts (solid content) |
|---|---|
| Butyl stearate | 2 parts |

-continued

| Stearic acid | 1 part |
|---|---|
| Methyl ethyl ketone | 50 parts |

Thereafter, the mixture was filtered through a filter having an average pore diameter of 1 µm to prepare a magnetic coating material for the upper layer.

Preparation of Coating Material for the Lower Layer

Eighty-five (85) parts of α-Fe₂O₃ (surface-treated to have Al₂O₃ and SiO₂ thereon, and having an average particle size of 0.15 µm, a BET specific surface area of 52 m²/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO₃Na=6×10⁻⁵ eq/g, epoxy= 10⁻³ eq/g, and weight-average molecular weight=30,000), 10 parts (solid content) of polyurethane 4B, and 60 D4 parts of cyclohexanone for 60 minutes. The mixture was then dispersed for 120 minutes in a sand mill with the addition thereto of the following component:

| Methyl ethyl ketone/cyclohexanone = 6/4 | 200 parts |
|---|---|

The dispersion was stirred and mixed for a further 20 minutes with the following components:

| Butyl stearate | 2 parts |
|---|---|
| Stearic acid | 1 part |
| Methyl ethyl ketone | 50 parts |

Thereafter, the mixture was filtered through a filter having an average pore diameter of 1 µm to prepare a coating material for the lower layer.

Preparation of Magnetic Tape

Then, a sulfonic acid-containing polyester resin was coated by means of a coil bar on the surface of a 10 µm thick polyethylene naphthalate substrate to prepare thereon an adhesive layer of 0.1 µm in thickness, as measured after drying.

Then, the coating material for the lower layer and the magnetic coating material for the upper layer were almost concurrently coated on the substrate in the described order using a reverse roll, the former with a post-drying thickness of 1.5 μm and the latter with a post-drying thickness of 0.1 μm. The nonmagnetic substrate with the magnetic coating material coated thereon was oriented in a magnetic field created by a 3,000 G magnet, while the magnetic coating material remained still undried, and then dried. The tape product was calendered through a combination of metal roll—in metal roll—metal roll—metal roll—metal roll—metal roll—metal roll at a speed of 100 m/min., a linear pressure of 300 kg/cm and a temperature of 90° C., and then cut to a width of 3.8 mm to prepare a magnetic tape.

The properties of the thus obtained magnetic tape were measured using the following estimation method. The results are reported in Table 9.

Examples 3-2 to 3-7, and Comparative Examples 3-1 to 3-12

In Examples 3-2 to 3-7 and Comparative Examples 3-1 to 3-12, magnetic tapes were prepared following Example 3-1 with the exception that polyurethane 3A for the upper magnetic layer and polyurethane 4B for the lower layer were changed to the polyurethanes shown in Table 9.

The properties of the thus obtained magnetic tapes were measured using the following estimation method. The results are reported in Table 9.

Example 3-8

In Example 3-8, a magnetic tape was prepared following Example 3-2 with the exception that the α-Fe$_2$O$_3$ (surface-created to have Al$_2$O$_3$ and SiO$_2$ thereon, and having an average particle size of 0.15 μm, a S$_{BET}$ value of 52 m$^2$/g and a pH value of 6.5 to 8.0) for the lower layer was changed to titanium oxide (crystal rutile having an average particle size of 0.035 μm, a TiO$_2$ content of 90% or more, a surface-treated layer of alumina, an S$_{BET}$ value of 35 to 42 m$^2$/g, a true specific gravity of 4.1 and a pH value of 6.5 to 8.0).

The properties of the thus obtained magnetic tapes were measured using the following estimation method. The results are reported in Table 9.

Comparative Examples 3-13 and 3-14

In these comparative examples, magnetic tapes were prepared following Example 3-8 with the exception that the polyurethanes for the upper, and lower layers were changed to the polyurethanes shown in Table 9.

The properties of the thus obtained magnetic tapes were measured using the following measuring method C. The results are reported in Table 9.

Measuring Method C a) Surface Roughness Ra:

Center-line average surface roughness Ra (in nm) was measured at a cut-off value of 0.25 mm using the MIRAU technique with a digital optical profilometer (made by WYKO).

b) Number of asperities of greater than 10 nm:

A sample was scanned over a 30 μm×30 μm range with a tunnel current 10 nA and a bias current of 400 mV, using NANOSCOPE made by Digital Instrument Co., Ltd. The obtained value was compared with that of Comparative Example 3-1 assumed to be 100.

c) Electromagnetic performance:

Using DDS3 drive (Model C1537, HP Co., Ltd.), a single-frequency signal of 4.7 MHz was recorded at the optimum recording current to measure an output upon reproduction. The output is shown on the basis of that of Comparative Example 3-1 assumed to be 100.

d) Durability after storage at high temperature and humidity:

First, a tape sample was stored for 1 week in an environment of 60° C. and 90% RH. In an environment of 40° C. and 80% RH, this sample was then placed under a load of 10 g (T1) while the surface of a magnetic layer thereof was in contact with a guide pole used for the DDS3 drive. Subsequently, tension (T2) was applied on the sample in such a manner that the rate of 8 mm/sec. was obtained. From T1/T1, the coefficient of friction of the magnetic surface with respect to the guide pole was found by the following equation.

For measurement, the sample was repeatedly run until 500 passes, and the coefficient of friction of the sample was measured at the first pass, and the 500th pass.

$$\text{Coefficient of friction} = 1/\pi \cdot \ln(T2/T1)$$

After measurement, contamination of the guide pole was observed under a differential interference optical microscope, and estimated on the following criterion.

Excellent: no contamination was observed at all.

Good: Uncontaminated spots are much more than contaminated spots.

Unsatisfactory: Contaminated spots are much more than uncontaminated spots.

TABLE 9

| | Type of polyurethane | | Surface roughness | Number of asperities | Durability after storage at high temperature and humidity | | |
|---|---|---|---|---|---|---|---|
| | Upper layer | Lower layer | Ra (nm) | of greater than 10 nm | Electro-magnetic performance | Coefficient of friction at the first pass | Coefficient of friction at the 500th pass | Contamination of guide rod |
| Example 3-1 | 3A | 4B | 1.8 | 73 | 115 | 0.28 | 0.34 | Excellent |
| Example 3-2 | 3B | 4B | 1.6 | 70 | 120 | 0.26 | 0.32 | Excellent |
| Example 3-3 | 3C | 4B | 1.7 | 72 | 118 | 0.27 | 0.33 | Excellent |
| Example 3-4 | 3D | 4B | 1.8 | 70 | 120 | 0.28 | 0.34 | Excellent |
| Example 3-5 | 3E | 4B | 1.7 | 69 | 122 | 0.28 | 0.33 | Excellent |
| Example 3-6 | 3B | 4A | 1.8 | 71 | 119 | 0.27 | 0.34 | Excellent |
| Example 3-7 | 3B | 4C | 1.8 | 70 | 118 | 0.29 | 0.35 | Excellent |
| Example 3-8 | 3B | 4B | 1.8 | 70 | 120 | 0.28 | 0.35 | Excellent |

TABLE 9-continued

|  | Type of polyurethane | | Surface roughness | Number of asperities | Durability after storage at high temperature and humidity | | | |
|---|---|---|---|---|---|---|---|---|
|  | Upper layer | Lower layer | Ra (nm) | of greater than 10 nm | Electro-magnetic performance | Coefficient of friction at the first pass | Coefficient of friction at the 500th pass | Contamination of guide rod |
| Comparative Example 3-1 | 3F | 4B | 2.5 | 100 | 100 | 0.29 | 0.48 | Unsatisfactory |
| Comparative Example 3-2 | 3G | 4B | 2.6 | 105 | 95 | 0.26 | 0.45 | Good |
| Comparative Example 3-3 | 3H | 4B | 2.6 | 105 | 94 | 0.27 | 0.45 | Unsatisfactory |
| Comparative Example 3-4 | 3B | 4D | 2.2 | 95 | 102 | 0.28 | 0.48 | Good |
| Comparative Example 3-5 | 3B | 4E | 1.8 | 100 | 100 | 0.32 | 0.62 | Excellent |
| Comparative Example 3-6 | 3B | 4F | 1.9 | 96 | 103 | 0.31 | 0.52 | Excellent |
| Comparative Example 3-7 | 3B | 4G | 2 | 102 | 95 | 0.31 | 0.49 | Excellent |
| Comparative Example 3-8 | 3B | 4H | 1.8 | 106 | 93 | 0.28 | 0.45 | Excellent |
| Comparative Example 3-9 | 3B | 3B | 1.8 | 98 | 100 | 0.28 | 0.46 | Excellent |
| Comparative Example 3-10 | 4B | 4B | 1.9 | 102 | 102 | 0.27 | 0.45 | Excellent |
| Comparative Example 3-11 | 3I | 4B | 2.3 | 98 | 105 | 0.28 | 0.44 | Good |
| Comparative Example 3-12 | 3J | 4B | 2.4 | 96 | 105 | 0.28 | 0.44 | Good |
| Comparative Example 3-13 | 3F | 4B | 2.6 | 106 | 93 | 0.29 | 0.48 | Excellent |
| Comparative Example 3-14 | 3B | 4D | 2.1 | 95 | 101 | 0.28 | 0.48 | Excellent |

Example 4-1

Preparation of Magnetic Coating Material for the Upper Layer

One hundred (100) parts of ferromagnetic alloy powders (composition: 89 at % Fe, 5 at % Co, and 6 at % Y, Hc: 2,000 Oe, crystallite size: 15 nm, BET specific surface area: 59 m$^2$/g, length: 0.12 μm, aspect ratio: 7, and σs: 150 emu/g) were pulverized in an open kneader for 10 minutes. Then, the powders were milled for 60 minutes with the components shown in Table 8:

| | |
|---|---|
| Polyurethane 4A | 20 parts (solid content) |
| Cyclohexanone | 60 parts |

Then, the mixture was dispersed for 120 minutes in a sand mill with the addition thereto of the following components:

| | |
|---|---|
| Abrasive (Al$_2$O$_3$ with a particle size of 0.3 μm) | 2 parts |
| Carbon black (with a particle size of 40 nm) | 2 parts |
| Methyl ethyl ketone/toluene = 1/1 | 200 parts |

The dispersion was stirred and mixed together for a further 20 minutes with the addition thereto of the following components:

| | |
|---|---|
| Polyisocyanate (Colonate 3041 made by Nippon Polyurethane Co., Ltd.) | 5 parts (solid content) |
| Butyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material for the upper layer.

Preparation of Coating Material for the Lower Layer

Eighty-five (85) parts of α-Fe$_2$O$_3$ (surface-treated to have Al$_2$O$_3$ and SiO$_2$ thereon, and having an average particle size of 0.15 μm, a BET specific surface area of 52 m$^2$/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO$_3$Na=6×10$^{-5}$ eq/g, epoxy=10$^{-3}$ eq/g, and weight-average molecular weight=30,000), 10 parts (solid content) of polyurethane 3B shown in Table 7, and 60 parts of cyclohexanone for 60 minutes. The mixture was then dispersed for 120 minutes in a sand mill with the addition thereto of the following component:

| | |
|---|---|
| Methyl ethyl ketone/cyclohexanone = 6/4 | 200 parts |

The dispersion was stirred and mixed for a further 20 minutes with the following components:

| Butyl stearate | 2 parts |
| Stearic acid | 1 part |
| Methyl ethyl ketone | 50 parts |

Thereafter, the mixture was filtered through a filter having an average pore diameter of 1 µm to prepare a coating material for the lower layer.

Preparation of Magnetic Tape

Then, a sulfonic acid-containing polyester resin was coated by means of a coil bar on the surface of a 10 µm thick polyethylene naphthalate substrate to prepare thereon an adhesive layer of 0.1 µm in thickness, as measured after drying.

Then, the coating material for the lower layer and the magnetic coating material for the upper layer were almost concurrently coated on the substrate in the described order using a reverse roll, the former with a post-drying thickness of 1.5 µm and the latter with a post-drying thickness of 0.1 µm. The nonmagnetic substrate with the magnetic coating material coated thereon was oriented in a magnetic field created by a 3,000 G magnet, while the magnetic coating material remained still undried, and then dried. The tape product was calendered through a combination of metal roll—metal roll—metal roll—metal roll—metal roll—metal roll —metal roll at a speed of 100 m/min., a linear pressure of 300 kg/cm and a temperature of 90° C., and then cut to a width of 3.8 mm to prepare a magnetic tape.

The properties of the thus obtained magnetic tape were measured using the following estimation method. The results are reported in Table 10.

Examples 4-2 to 4-7, and Comparative Examples 4-1 to 4-12

In Examples 4-2 to 4-7 and Comparative Examples 4-1 to 4-12, magnetic tapes were prepared following Example 4-1 with the exception that polyurethane 4A for the upper magnetic layer and polyurethane 3B for the lower layer were changed to the polyurethanes shown in Table 10.

The properties of the thus obtained magnetic tapes were measured using the following estimation method. The results are reported in Table 10.

Example 4-8

In Example 4-8, a magnetic tape was prepared following Example 4-2 with the exception that the α-Fe$_2$O$_3$ (surface-treated to have Al$_2$O$_3$ and SiO$_2$ thereon, and having an average particle size of 0.15 µm, a SBET value of 52 m$^2$/g and a pH value of 6.5 to 8.0) for the lower layer was changed to titanium oxide (crystal rutile having an average particle size of 0.035 µm, a TiO$_2$ content of 90% or more, a surface-treated layer of alumina, an S$_{BET}$ value of 35 to 42 m$^2$/g, a true specific gravity of 4.1 and a pH value of 6.5 to 8.0).

The properties of the thus obtained magnetic tapes were mt measured using the following estimation method. The results are reported in Table 10.

Comparative Examples 4-13 and 4-14

In these comparative examples, magnetic tapes were prepared following Example 4-8 with the exception that the polyurethanes for the upper, and lower layers were changed to the polyurethanes shown in Table 10.

The properties of the thus obtained magnetic tapes were measured using the following measuring method D. The results are reported in Table 10.

Measuring Method D a) Surface roughness Ra:

Center-line average surface roughness Ra (in nm) was measured at a cut-off value of 0.25 mm using the MIRAU technique with a digital optical profilometer (made by WYKO).

b) Electromagnetic performance:

Using a drum tester (made by Kono Seisakusho), signals were recorded on a sample tape at a recording wavelength of 0.5 µm and a head speed of 10 m/sec., and then reproduced to measure output upon reproduction. Relative output is shown on the basis of the output of Comparative Example 4-1 assumed to be 100.

c) Durability after storage at high temperature and humidity:

(1) Output drop, and contamination of video head:

First, a 60-minute tape was stored for 1 week in an environment of 60° C. and 90% RH. In an environment of 40° C. and 80% RH, the tape was then run repeatedly 100 times through a digital video tape recorder (NV-BJ1, Matsushita Electric Industrial Co., Ltd.) to observe contamination of the video head. Relative output was estimated on the basis of the output at the first run, assumed to be 0 dB. The criterion of estimation is excellent: no contamination of the head was visually observed at all, and unsatisfactory: contamination of the head was visually observed.

(2) Still durability:

Still durability was estimated by a period of time to a 50% output drop in a still state in a digital video tape recorder (NV-BJ1, Matsushita Electric Industrial Co., Ltd.) maintained in a 40° C. and 80% RH environment.

TABLE 10

| | Type of polyurethane | | Center-line average roughness Ra (nm) | Electro-magnetic performance | Durability after storage at high temperature and humidity | | |
| | Upper layer | Lower layer | | | Output drop (dB) | Contamination of head | Still Durability |
|---|---|---|---|---|---|---|---|
| Example 4-1 | 4A | 3B | 1.8 | 120 | −0.2 | Excellent | ≧60 min. |
| Example 4-2 | 4B | 3B | 1.8 | 120 | −0.3 | Excellent | ≧60 min. |
| Example 4-3 | 4C | 3B | 1.8 | 118 | −0.3 | Excellent | ≧60 min. |
| Example 4-4 | 4B | 3A | 1.6 | 120 | −0.3 | Excellent | ≧60 min. |
| Example 4-5 | 4B | 3C | 1.7 | 115 | −0.2 | Excellent | ≧60 min. |
| Example 4-6 | 4B | 3D | 1.8 | 119 | −0.3 | Excellent | ≧60 min. |
| Example 4-7 | 4B | 3E | 1.7 | 118 | −0.2 | Excellent | ≧60 min. |
| Example 4-8 | 4B | 3B | 1.8 | 120 | −0.2 | Excellent | ≧60 min. |
| Example 4-1 | 4D | 3B | 2 | 100 | −0.6 | Excellent | 55 min. |

TABLE 10-continued

|  | Type of polyurethane | | Center-line average roughness Ra (nm) | Electro-magnetic performance | Durability after storage at high temperature and humidity | | |
|---|---|---|---|---|---|---|---|
|  | Upper layer | Lower layer |  |  | Output drop (dB) | Contamination of head | Still Durability |
| Example 4-2 | 4E | 3B | 1.8 | 105 | −0.9 | Unsatisfactory | 28 min. |
| Example 4-3 | 4F | 3B | 1.9 | 100 | −1 | Unsatistory | 36 min. |
| Example 4-4 | 4G | 3B | 2 | 102 | −0.9 | Unsatisfactory | 42 min. |
| Example 4-5 | 4H | 3B | 1.8 | 100 | −0.6 | Excellent | 50 min. |
| Example 4-6 | 4B | 3F | 2.5 | 95 | −0.7 | Excellent | 56 min. |
| Example 4-7 | 4B | 3G | 2.6 | 94 | −0.6 | Excellent | 48 min. |
| Example 4-8 | 4B | 3H | 2.6 | 93 | −0.7 | Excellent | 50 min. |
| Example 4-9 | 4B | 4B | 1.8 | 100 | −0.7 | Excellent | 50 min. |
| Example 4-10 | 4B | 3B | 1.9 | 102 | −1 | Unsatisfactory | 30 min. |
| Example 4-11 | 4B | 3I | 2.3 | 105 | −0.6 | Excellent | 36 min. |
| Example 4-12 | 4B | 3J | 2.4 | 102 | −0.6 | Excellent | 49 min. |
| Example 4-13 | 4B | 3F | 2.6 | 93 | −0.9 | Unsatisfactory | 34 min. |
| Example 4-14 | 4D | 3B | 2.1 | 101 | −0.8 | Unsatisfactory | 36 min. |

The magnetic recording medium of the invention undergoes no increase in the coefficient of friction upon storage at high temperatures, and has more improved electromagnetic performance due to improvements in the dispersibility of magnetic powders. In addition, the surface strength of the magnetic layer is so improved that contamination of a head due to repeated running can be prevented, with no output drop. Unexpectedly, a tape type medium having high durability and excellent electromagnetic performance is achieved, because the dropout increase can be reduced due to a reduced tape edge cracking. An improvement in the smoothness of the coating layer gives rise to improvements in durability against running, dispersibility, and the orientation capability of magnetic powders. Although the magnetic layer has a smooth surface, the coefficient of friction decreases, resulting in excellent electromagnetic performance, improved storage stability at high temperatures, and stable running performance.

The polyurethane resin, which has high dispersibility and ensures a smooth surface so that the amount of migration at an interface in a multilayer structure can be reduced, is used as the binder for the lower layer. Accordingly, even when the upper magnetic layer is stacked on the lower layer, the magnetic layer has a high surface smoothness because the interface in the multilayer structure is in good order. In addition, the magnetic layer has high heat resistance. The magnetic recording medium of the invention can thus be more durable in high temperature and humidity environments.

Excellent electromagnetic performance is achieved due to the high surface smoothness of the magnetic layer. In addition, the magnetic layer has high heat resistance. The magnetic recording medium of the invention can thus be improved in terms of still durability in high temperature and humidity environments.

What we claim is:

1. A magnetic recording medium comprising a nonmagnetic substrate and at least one magnetic layer provided on said nonmagnetic substrate, in which magnetic layer a ferromagnetic powder and a binder are dispersed together, wherein:

said magnetic layer comprises as said binder a polyurethane obtained from a polyester polyol, a chain extender, and an organic diisocyanate, and said ferromagnetic powder is a ferromagnetic powder comprising cobalt-containing iron as a main component and said ferromagnetic powder has an yttrium-to-iron atomic ratio of Y/Fe=0.5 to 20 at %, said polyurethane being a polyurethane comprising a polyester polyol containing an aliphatic dibasic acid as a dibasic acid therein, and a diol component, wherein at least 70 mol % of said diol component contains an alkyl branched side chain having at least 2 carbon atoms.

2. The magnetic recording medium according to claim 1, wherein said ferromagnetic powder is a ferromagnetic powder comprising iron as the main component.

3. The magnetic recording medium according to claim 1, wherein said ferromagnetic powder is a ferromagnetic powder comprising aluminum-containing iron as the main component.

4. The magnetic recording medium according to claim 1, wherein said ferromagnetic powder has a length of 0.05 to 0.25 $\mu$m.

5. The magnetic recording medium according to claim 1, wherein said ferromagnetic powder has a crystallite size of 12 to 25 nm.

6. The magnetic recording medium according to claim 1, wherein said polyurethane is a polyurethane (PA1) in which a polyester polyol comprises an aliphatic dibasic acid as a dibasic acid, and a diol component, wherein at least 70 mol % of said diol component contains a cyclic structure-free alkyl branched side chain having at least 2 carbon atoms, or a polyurethane (PA2) which comprises a polyester polyol comprising an aliphatic dibasic acid as a dibasic acid, and a diol component, wherein at least 70 mol % of said diol component contains an alkyl branched aliphatic diol having a total of at least 2 carbon atoms in a branched side chain thereof per molecule and a chain extender comprising an alkyl branched aliphatic diol having a total of at least 3 carbon atoms in a branched side chain thereof per molecule.

7. The magnetic recording medium according to claim 1, wherein said polyurethane is a polyurethane having at least one polar group selected from the following group:

$SO_3M$, $SO_4M$, $PO_3M_2$, $OPO_3M_2$, and $-NR_2$, where M represents a hydrogen atom, an alkaline metal, an alkaline earth metal, or ammonium, and R stands for an alkyl group having 1 to 12 carbon atoms.

8. A magnetic recording medium comprising a nonmagnetic substrate, a lower layer provided on said nonmagnetic substrate, in which lower layer a magnetic powder or an inorganic powder and a binder are dispersed together, and at least one magnetic layer provided on said lower layer, in which magnetic layer a ferromagnetic powder and a binder are dispersed together, wherein at least one binder in said lower layer and said magnetic layer comprises as a substantial binder a polyurethane obtained from a polyester polyol, a chain extender and an organic diisocyanate, and said ferromagnetic powder is a ferromagnetic powder containing iron as a main component and having an yttrium-to-iron ratio, Y/Fe, of 0.5 to 20 at %, said polyurethane being a polyurethane comprising a polyester polyol containing an aliphatic dibasic acid as a dibasic acid therein, and a diol component, wherein at least 70 mol % of said diol component contains an alkyl branched side chain having at least 2 carbon atoms.

9. The magnetic recording medium according to claim 8, characterized in that polyurethane is a polyurethane (PA1) in which a polyester polyol comprises an aliphatic dibasic acid as a dibasic acid, and a diol component, wherein at least 70 mol % of said diol component contains a cyclic structure-free alkyl branched side chain having at least 2 carbon atoms, or a polyurethane (PA2) which comprises a polyester polyol comprising an aliphatic dibasic acid as a dibasic acid, and a diol component, wherein at least 70 mol % of said diol component contains an alkyl branched aliphatic diol having a total of at least 2 carbon atoms in a branched side chain thereof per molecule and a chain extender comprising an alkyl branched aliphatic diol having a total of at least 3 carbon atoms in a branched side chain thereof per molecule.

10. The magnetic recording medium according to claim 8, wherein said polyurethane is a polyurethane having at least one polar group selected from the following group, $SO_3M$, $SO_4M$, $PO_3M_2$, $OPO_3M_2$, and $-NR_2$, where M represents a hydrogen atom, an alkaline metal, an alkaline earth metal, or ammonium, and R stands for an alkyl group having 1 to 12 carbon atoms.

11. The magnetic recording medium according to claim 8, wherein said magnetic layer has a thickness of at most 0.2 μm upon drying and said lower layer has a thickness of at least 1 μm upon drying.

12. The magnetic recording medium according to claim 8, wherein said magnetic layer contains an organic phosphorus compound selected from those represented by the following formulae (1) to (3):

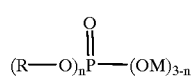 (1)

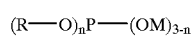 (2)

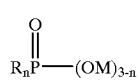 (3)

where R represents an unsubstituted or substituted alkyl, alkenyl or aryl group, and n=1 or 2.

13. The magnetic recording medium according to claim 8, wherein at least one of said lower layer and said magnetic layer contains an organic phosphorus compound selected from those represented by the following formulae (1) to (3), and said magnetic layer has a thickness of at most 1.0 μm,

 (1)

 (2)

 (3)

where R represents an unsubstituted or substituted alkyl, alkenyl or aryl group, and n=1 or 2.

14. The magnetic recording medium according to claim 13, wherein said polyurethane (PA1) or (PA2) has an urethane group concentration of 3.0 meq/g to 4.0 meq/g.

15. The magnetic recording medium according to claim 8, wherein said binder in said magnetic layer contains a polyurethane obtained by reaction of raw materials including a polyester polyol, a chain extender and an organic diisocyanate, said polyurethane being a polyurethane (PA3) comprising a polyester polyol containing an aliphatic dibasic acid as a dibasic acid, and an aliphatic diol component, wherein at least 70 mol % of said diol component comprises a cyclic structure-free alkyl branched side chain and a chain extender comprising an aliphatic diol comprising an alkyl branched side chain having a total of at least 3 carbon atoms in a branched side chain thereof, and said binder in said lower layer is a polyurethane (PB1) comprising 10 to 50% by weight of a polyol containing 1.0 to 6.0 mmol/g of an ether group, 15 to 50% by weight of a chain extender comprising a diol having a cyclic structure and an organic diisocyanate.

16. The magnetic recording medium according to claim 15, wherein said polyurethane (PA3) has an urethane group concentration of 2.5 to 4.5 mmol/g.

17. The magnetic recording medium according to claim 15, wherein said polyurethane (PB1) comprises a polyol containing 1.0 to 6.0 mmol/g of an ether group therein, as represented by

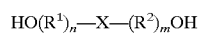

where:

n=4 to 40, and m=4 to 40,

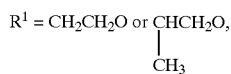

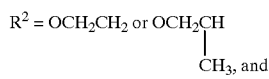

X is at least one group selected from the following group:

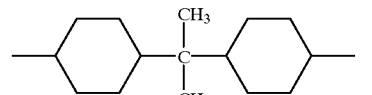

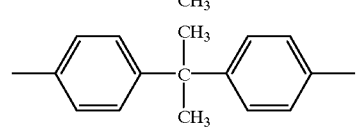

-continued

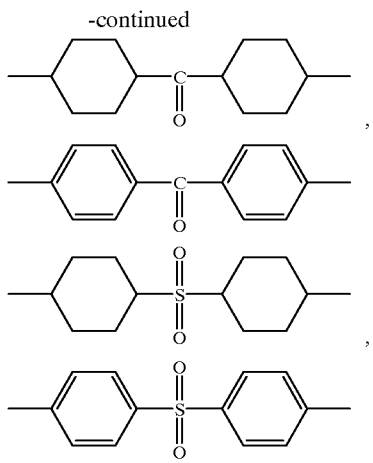

18. The magnetic recording medium according to claim 15, wherein said polyurethane (PB1) comprises a diol chain extender having a cyclic structure as represented by the following formula:

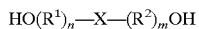

where:

n=0 to 3, and m=0 to 3,

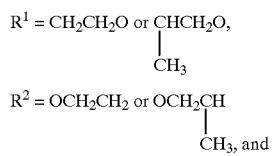

X is at least one group selected from the following group:

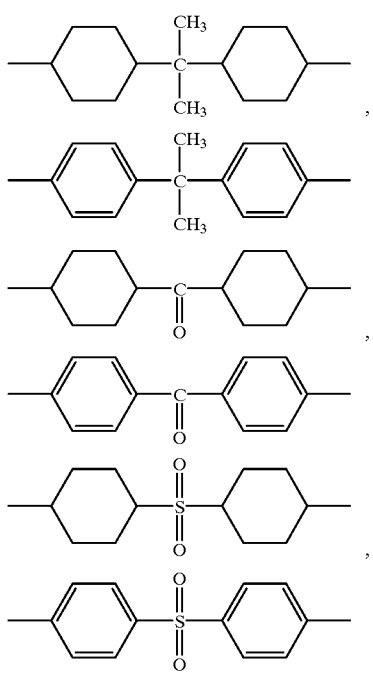

19. The magnetic recording medium according to claim 8, wherein said binder in said magnetic layer is a polyurethane (PB1) comprising 10 to 50% by weight of a polyol containing 1.0 to 6.0 mmol/g of an ether group, 15 to 50% by weight of a chain extender comprising a diol having a cyclic structure and an organic diisocyanate, and said binder in said lower layer contains a polyurethane obtained by reaction of raw materials including a polyester polyol, a chain extender and an organic diisocyanate, said polyurethane being a polyurethane (PA3) comprising a polyester polyol containing an aliphatic dibasic acid as a dibasic acid and an aliphatic diol component, wherein at least 70 mol % of said diol component comprises a cyclic structure-free alkyl branched side chain and a chain extender comprising an aliphatic diol comprising an alkyl branched side chain having a total of at least 3 carbon atoms in a branched side chain thereof.

20. The magnetic recording medium according to claim 19, wherein said polyurethane (PA3) has an urethane group concentration of 2.5 to 4.5 mmol/g.

21. The magnetic recording medium according to claim 19, wherein said polyurethane (PB1) comprises a polyol containing 1.0 to 6.0 mmol/g of an ether group therein, as represented by

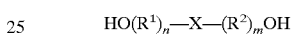

where:

n=4 to 40, and m=4 to 40,

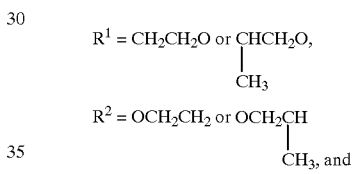

X is at least one group selected from the following group:

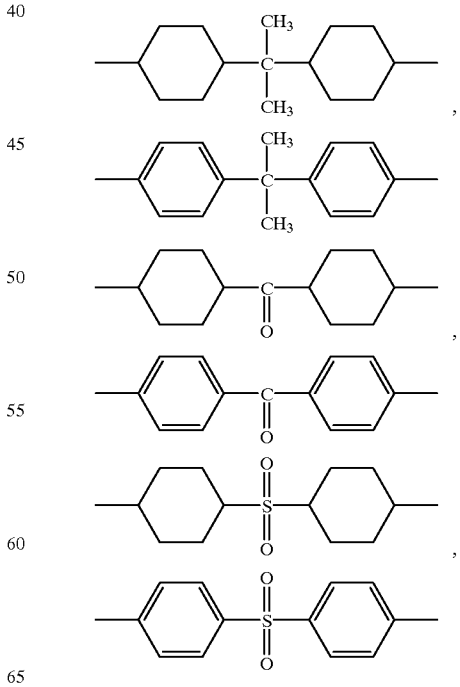

22. The magnetic recording medium according to claim 19, wherein said polyurethane (PB1) comprises a diol chain extender having such a cyclic structure as given by
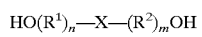
where:
n=0 to 3, and m=0 to 3,
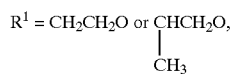
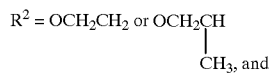
X is at least one group selected from the following group:
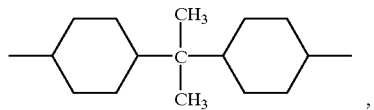
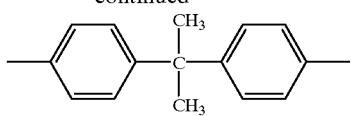
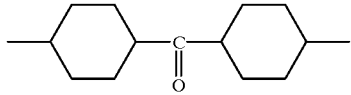
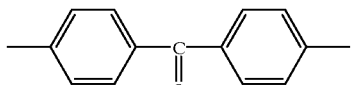
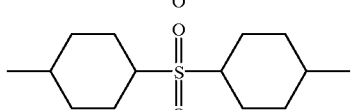
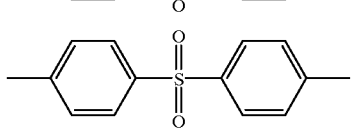
* * * * *